(12) United States Patent
Kunito

(10) Patent No.: US 8,825,807 B2
(45) Date of Patent: Sep. 2, 2014

(54) DELIVERY SERVER, CONTENT DELIVERY METHOD OF DELIVERY SERVER, BOOSTER SERVER, CONTENT DELIVERY METHOD OF BOOSTER SERVER

(75) Inventor: Yoshiyuki Kunito, Kanagawa (JP)

(73) Assignee: Sony Corporation, Tokyo (JP)

( * ) Notice: Subject to any disclaimer, the term of this patent is extended or adjusted under 35 U.S.C. 154(b) by 257 days.

(21) Appl. No.: 12/257,907

(22) Filed: Oct. 24, 2008

(65) Prior Publication Data

US 2009/0144400 A1  Jun. 4, 2009

(30) Foreign Application Priority Data

Nov. 29, 2007  (JP) ................................. 2007-308331

(51) Int. Cl.
*G06F 15/16* (2006.01)
*H04N 7/173* (2011.01)
*H04N 21/24* (2011.01)
*H04L 29/06* (2006.01)
*H04L 12/56* (2006.01)

(52) U.S. Cl.
CPC ...... *H04N 21/2405* (2013.01); *H04L 29/06285* (2013.01); *H04L 47/12* (2013.01)
USPC .............................. 709/219; 709/231; 725/96

(58) Field of Classification Search
CPC ............. H04L 29/06285; H04L 47/12; H04N 21/2405
USPC .......... 709/222, 243, 231, 244, 219; 725/114, 725/115, 143–145, 96; 718/105
See application file for complete search history.

(56) References Cited

U.S. PATENT DOCUMENTS

| | | | | |
|---|---|---|---|---|
| 6,516,350 B1 * | 2/2003 | Lumelsky et al. | ............ | 709/226 |
| 6,760,765 B1 * | 7/2004 | Asai et al. | ...................... | 709/226 |
| 6,970,909 B2 * | 11/2005 | Schulzrinne | .................. | 709/206 |
| 7,155,475 B2 * | 12/2006 | Agnoli et al. | ................. | 709/201 |
| 7,174,373 B1 * | 2/2007 | Lausier | ........................ | 709/223 |

(Continued)

FOREIGN PATENT DOCUMENTS

| JP | 2003-186778 A | 7/2003 |
|---|---|---|
| JP | 2004-007228 | 1/2004 |

(Continued)

OTHER PUBLICATIONS

U.S. Appl. No. 12/723,160, filed Mar. 12, 2010, Kunito, et al.

(Continued)

*Primary Examiner* — Gregory Todd
(74) *Attorney, Agent, or Firm* — Oblon, Spivak, McClelland, Maier & Neustadt, L.L.P.

(57) ABSTRACT

A delivery server includes a content output unit configured to output content, a delivery request reception unit which receives a delivery request transmitted from a client terminal connected to a network, a determination unit which determines whether the content is to be delivered to the client terminal in response to the delivery request when the delivery request is received using the delivery request reception unit, and a transmission unit which transmits the content output from the content output unit to the client terminal when the determination unit determines that the content is to be delivered, and transmit the content output from the content output unit to a booster server connected to the network and further transmit a transfer command including information on the booster server to the client terminal when the determination unit determines that the content is not to be transmitted.

7 Claims, 18 Drawing Sheets

(56) References Cited

U.S. PATENT DOCUMENTS

| | | | |
|---|---|---|---|
| 7,403,993 B2* | 7/2008 | John et al. | 709/226 |
| 7,532,618 B1* | 5/2009 | Saurabh et al. | 370/352 |
| 7,680,938 B2* | 3/2010 | Oesterreicher et al. | 709/226 |
| 7,822,862 B2* | 10/2010 | Slater et al. | 709/229 |
| 7,996,553 B2* | 8/2011 | Keller et al. | 709/232 |
| 2002/0026560 A1* | 2/2002 | Jordan et al. | 711/120 |
| 2002/0056131 A1* | 5/2002 | Hayashi et al. | 725/115 |
| 2004/0059820 A1* | 3/2004 | Holden et al. | 709/227 |
| 2005/0262246 A1* | 11/2005 | Menon et al. | 709/226 |
| 2008/0010380 A1* | 1/2008 | Whitehead et al. | 709/227 |

FOREIGN PATENT DOCUMENTS

| | | |
|---|---|---|
| JP | 2004-110277 | 4/2004 |
| JP | 2004-241835 | 8/2004 |
| JP | 2005-027009 | 1/2005 |
| JP | 2005-259124 A | 9/2005 |
| JP | 2005-327155 | 11/2005 |
| JP | 2006-171822 A | 6/2006 |
| JP | 2007-18294 A | 1/2007 |
| JP | 2007-150462 | 6/2007 |
| JP | 2007-193602 A | 8/2007 |

OTHER PUBLICATIONS

Office Action issued Apr. 3, 2012, in Japanese Patent Application No. 2007-308331 with English translation.

Tatsuro Murakami, New Generation Network, Information Processing, vol. 47, No. 10, Japan, Corporate Juridical Person Information Processing Society, Oct. 15, 2006, pp. 1091-1099, and cover pages.

Japanese Office Action issued Sep. 18, 2012 in Japanese Application No. 2007-308331 filed Nov. 29, 2007 (with English translation).

Hideki Arai and nine members, "SIP Textbook", Impress, Inc. R&D, Jul. 1, 2006, Second Edition, pp. 133-169.

* cited by examiner

DELIVERY SERVER, CONTENT DELIVERY METHOD OF DELIVERY SERVER, BOOSTER SERVER, CONTENT DELIVERY METHOD OF BOOSTER SERVER

CROSS REFERENCES TO RELATED APPLICATIONS

The present invention contains subject matter related to Japanese Patent Application JP 2007-308331 filed in the Japanese Patent Office on Nov. 29, 2007, the entire contents of which are incorporated herein by reference.

BACKGROUND OF THE INVENTION

1. Field of the Invention

The present invention relates to delivery servers, content delivery methods for the delivery servers, booster servers, and content delivery methods for the booster servers. The present invention particularly relates to a delivery server, for example, which transmits content to a booster server and a transmission command including information on the booster server to a client terminal so that the content is transmitted from the booster server to the client terminal when a delivery server is not available for a delivery request transmitted from the client terminal. Accordingly, a delivery service business may be started in a small way using the delivery server.

2. Description of the Related Art

In recent years, a construction of an NGN (Next Generation Network) which is obtained by replacing a telephone network of a line switching system in the related art by a network based on an P (Internet Protocol) technique has been promoted. The NGN has band ensuring function and a security function. In the NGN, session control is performed using an SIP (Session Initiation Protocol).

In such an NGN, a client terminal receives content such as a video image or music delivered from a delivery server. In this case, it is difficult to recognize the number of delivery requests transmitted from the client server and determine a server resource necessary for the transmitted delivery requests.

For example, Japanese Unexamined Patent Application Publication No. 2004-110277, Japanese Unexamined Patent Application Publication No. 2005-327155, and Japanese Unexamined Patent Application Publication No. 2004-7228 disclose systems in which a delivery server (content provision server) transmits content such as a video image or music to a client terminal (user terminal) through a network such as the Internet.

FIG. 18 shows streaming deliveries in which image pickup data is delivered from a camera server 210 serving as a delivery server through a network 230 to client terminals 220a to 220c. The number of streaming deliveries performed by the single camera server 210 is limited due to capability of a CPU (Central Processing Unit), for example. When streaming deliveries which maintain high image qualities are performed, the number of deliveries is more strictly limited.

In order to obtain the increased number of deliveries, load distribution techniques have been proposed. An example of the load distribution techniques includes load distribution employing a DNS (Domain Name System) shown in FIG. 19. In this load distribution technique, when a client terminal 220 requests a DNS server 240 to transmit IP addresses of delivery servers, the DNS server 240 assigns IP addresses to the delivery servers, i.e., delivery servers 0 to 2 (delivery servers 210a to 210c) and transmits the assigned IP addresses to the client terminal 220. In this way, load applied to each of the delivery servers is reduced.

Furthermore, an example of the load distribution techniques includes load distribution employing a load balancer (switch) shown in FIG. 20. In this load distribution technique, when a client terminal 220 requests a DNS server 240 to transmit IP addresses of delivery servers, the DNS server 240 transmits information on an IP address of a load balancer 250 to the client terminal 220, and the load balancer 250 successively assigns IP addresses to delivery servers 0 to 2, i.e., delivery servers 210a to 210c. In this way, load applied to each of the delivery servers is reduced.

Furthermore, in order to increase the number of deliveries, a multicast method has been proposed in recent years. Examples of the multicast method include an IP multicast and application level multicast.

SUMMARY OF THE INVENTION

In the load distribution technique using the DNS server 240, the load distribution technique using the load balancer 250, or the IP multicast described above, there arise problems in that such techniques are not employed unless the number of demands of deliveries is known in advance (a) and in that a large amount of initial investment is necessary assuming that a large number of deliveries are performed (b) On the other hand, in the application level multicast, there arise problems in that a client terminal should have a special configuration for delivery employing P2P (peer-to-peer) communication (a), in that it is difficult to ensure excellent communication quality (b), and in that it is difficult to manage connection history necessary for charging (c). That is, the load distribution techniques and the multicast technique in the related art described above are not suitable for small start of content delivery service business.

It is desirable to provide content delivery service which is started in a small way.

According to an embodiment of the present invention, there is provided a delivery server including a content output unit configured to output content, a delivery request reception unit configured to receive a delivery request transmitted from a client terminal connected to a network, a determination unit configured to determine whether the content is to be delivered to the client terminal in response to the delivery request when the delivery request is received using the delivery request reception unit, and a transmission unit configured to transmit the content output from the content output unit to the client terminal which is a transmission source of the delivery request received using the delivery request reception unit when the determination unit determines that the content is to be delivered, and transmit the content output from the content output unit to a booster server connected to the network and further transmit a transfer command including information on the booster server to the client terminal which is the transmission source of the delivery request received using the delivery request reception unit when the determination unit determines that the content is not to be delivered.

According to another embodiment of the present invention, there is provided a booster server including a content reception unit configured to receive content delivered from a delivery server connected to a network, a delivery request reception unit configured to receive a delivery request transmitted from a client terminal connected to the network, and a content delivery unit configured to deliver, when the delivery request reception unit received the delivery request, the content received using the content reception unit to the client terminal which is a transmission source of the delivery request received using the delivery request reception unit.

With this configuration, the delivery server, the client terminal, and the booster server are connected to one another through the network. The network corresponds to an NGN (Next Generation Network). When the client terminal transmits a delivery request, the delivery server determines whether content is to be transmitted from the delivery server itself in response to the delivery request. For example, the delivery server determines that the delivery server transmits content to the client terminal 105 when the number of deliveries is smaller than the number of deliveries corresponding to delivery capability of the delivery server.

When it is determined that the content may be delivered from the delivery server in response to the delivery request, the content is delivered from the delivery server to the client terminal. For example, the delivery server includes an image pickup unit configured to capture an image of an object and output image pickup data corresponding to the image of the object. The image pickup data output from the image pickup unit is delivered as content to the client terminal.

On the other hand, when it is determined that the delivery server is not available for a content delivery operation in response to the delivery request, the delivery server transmits the content to the booster server and transmits a transfer command including information on the booster server to the client terminal. Therefore, the client terminal transfers the delivery request to the booster server, and the content is delivered to the client terminal from the booster server instead of the delivery server.

As described above, the delivery server itself transmits content to the client terminals when the delivery server is available for delivery requests supplied from the client terminals since the number of delivery requests is small. In this case, the content may be delivered without using the booster server, and accordingly, a delivery service business may be started in a small way. On the other hand, in a case where the delivery server is not available for delivery requests transmitted from the client terminals since the number of deliveries is large, the booster server may be utilized for delivery of the content so as to flexibly address the increased number of deliveries.

For example, when the booster server is not available for a delivery request transmitted form a client terminal, content output from the content output unit may be transmitted to another booster server connected to the network and a transfer command including information on the other booster server may be transmitted to the client terminal which is a transmission source of the delivery request received using the delivery request reception unit. In this case, the number of booster servers to be used may be increased to address the increased number of deliveries.

Accordingly, when the delivery server is not available for a delivery request transmitted form the client terminal, the delivery server transmits content to the booster server and transmits a transfer command including information on the booster server to the client terminal, and the booster server transmits the content to the client terminal. With this configuration, delivery service business may be started in a small way.

DESCRIPTION OF THE PREFERRED EMBODIMENTS

Figure 1:
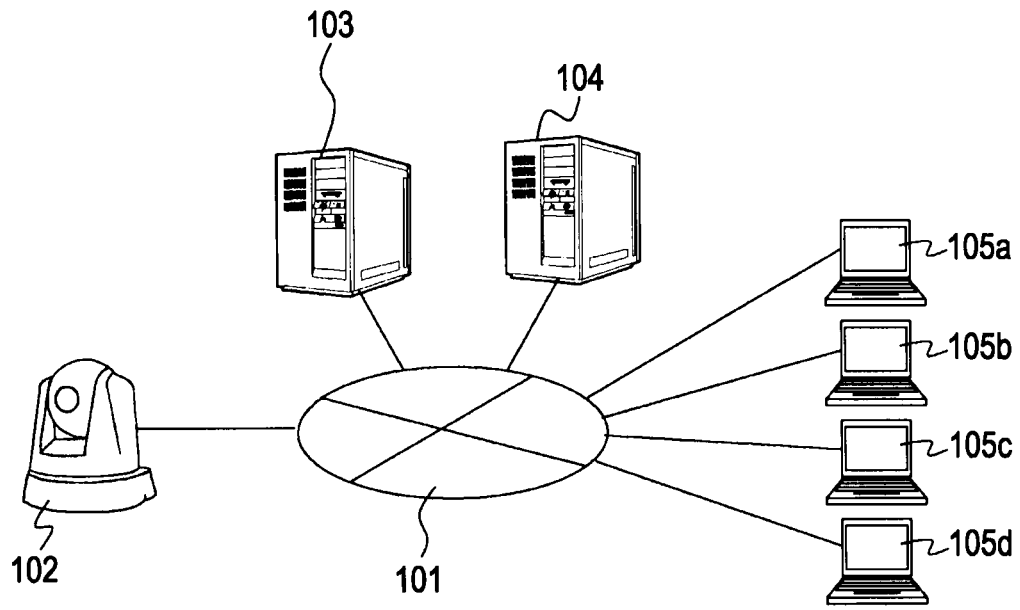
FIG. 1 is a block diagram illustrating an example of a configuration of a content delivery system according to an embodiment of the present invention.

Embodiments of the present invention will be described hereinafter with reference to the accompanying drawings. FIG. 1 shows an example of a configuration of a content delivery system 100 according to an embodiment of the present invention. In the content delivery system 100, a camera server 102, a booster server 103, a proxy server 104, and client terminals 105a to 105d (hereinafter referred to as a "client terminal 105" unless otherwise distinguished) are connected to an NGN (Next Generation Network) 101. The camera server 102 serves as a delivery server.

Figure 2:
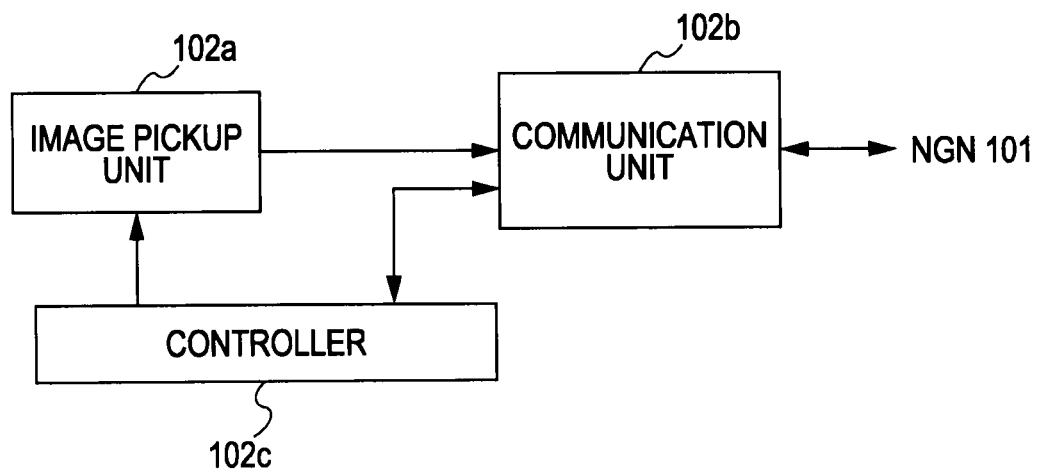
FIG. 2 is a block diagram illustrating an example of a configuration of a camera server.

FIG. 2 shows an example of a configuration of the camera server 102. The camera server 102 includes an image pickup unit 102a, a communication unit 102b, and a controller 102c. The image pickup unit 102a serves as a content output unit, the communication unit 102b serves as the content output unit, a delivery request reception unit, and a transmission unit, and the controller 102c serves as a determination unit and the transmission unit.

The controller 102c controls operations of the image pickup unit 102a and the communication unit 102b. The image pickup unit 102a captures an image of an object and outputs image pickup data corresponding to the image of the object. The camera server 102 appropriately transmits the image pickup data output from the image pickup unit 102a to the client terminal 105 and the booster server 103. The camera server 102 appropriately communicates with the client terminals 105a to 105d, the booster server 103, and the SIP proxy server 104.

The controller 102c of the camera server 102 determines whether the camera server 102 may transmit content to the client terminal 105 when the communication unit 102b receives a delivery request issued from the client terminal 105. The controller 102c determines that the camera server 102 may transmit content to the client terminal 105 when the number of deliveries is smaller than the number of deliveries corresponding to delivery capability of the camera server 102.

When determining that the camera server 102 may transmit content to the client terminal 105, the controller 102c controls the camera server 102 to transmit the image pickup data (stream) output from the image pickup unit 102a to the client terminal 105 which transmitted the delivery request. On the other hand, when determining that the camera server 102 may not transmit content to the client terminal 105 and when the booster server 103 is available, the controller 102c controls the communication unit 102b to transmit the image pickup data (stream) supplied from the image pickup unit 102a to the booster server 103 and transmit a transfer command including information on the booster server 103 to the client terminal 105 which transmitted the delivery request.

Note that, in a case where the booster server 103 is not available but another booster server (only the booster server 103 is shown in FIG. 1) is available, the controller 102c controls the communication unit 102b to transmit the image pickup data supplied from the image pickup unit 102a to the other booster server and transmit a transfer command including information on the other booster server to the client terminal 105 which transmitted the delivery request.

Figure 3:
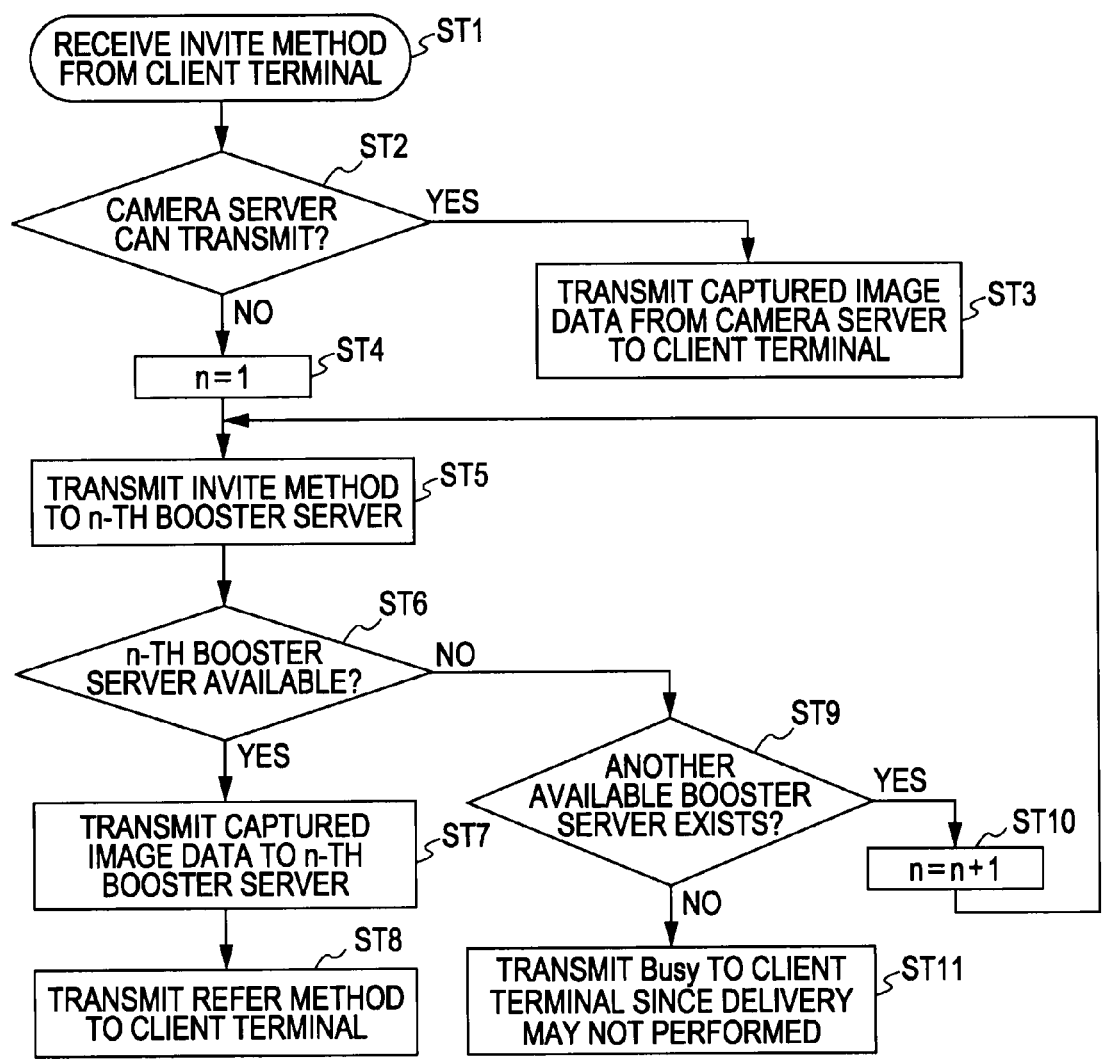
FIG. 3 is a flowchart illustrating a processing operation of a controller of the camera server performed when a client terminal issues a delivery request.

FIG. 3 is a flowchart illustrating a processing operation of the controller 102c performed when a client terminal issues a delivery request.

In step ST1, when receiving an INVITE method (delivery request) from a client terminal, the controller 102c starts a processing operation, and the process proceeds to step ST2. In step ST2, the controller 102c determines whether the camera server 102 including the controller 102c should perform a delivery operation. When the determination is affirmative in step ST2, the process proceeds to step ST3 where image pickup data (stream) is delivered from the camera server 102 to the client terminal.

On the other hand, when the determination is negative in step ST2, the controller 102c sets 1 to a variable n in step ST4, and thereafter, the process proceeds to step ST5. In step ST5, the controller 102c transmits the INVITE method to an n-th booster server, and the process proceeds to step ST6.

In step ST6, the controller 102c determines whether the n-th booster server is available. The controller 102c determines that the n-th booster server is available when the n-th booster server transmits a 200-OK response code to the controller 102c in step ST6.

When the determination is affirmative in step ST6, the process proceeds to step ST7 where the controller 102c controls the camera server 102 to transmit image pickup data (stream) to the n-th booster server. Then, in step ST8, the controller 102c transmits a transfer command including information on the n-th booster server to the client terminal. Then, the client terminal transfers the INVITE method (delivery request) to the n-th booster server, and thereafter, the image pickup data (stream) is delivered from the n-th booster server to the client terminal instead of the camera server 102.

When the determination is negative in step ST6, the controller 102c proceeds to step ST9. In step ST9, the controller 102c determines whether another booster server which is available exists. When the determination is affirmative in step ST9, the controller 102c proceeds to step ST10 where the variable n is incremented and thereafter the controller 102c returns to step ST5. On the other hand, when the determination is negative in step ST9, the controller 102c proceeds to step ST11 where the controller 102c transmits a Busy signal serving as a global error response to the client terminal since the image pickup data (stream) should not be delivered.

Figure 4:
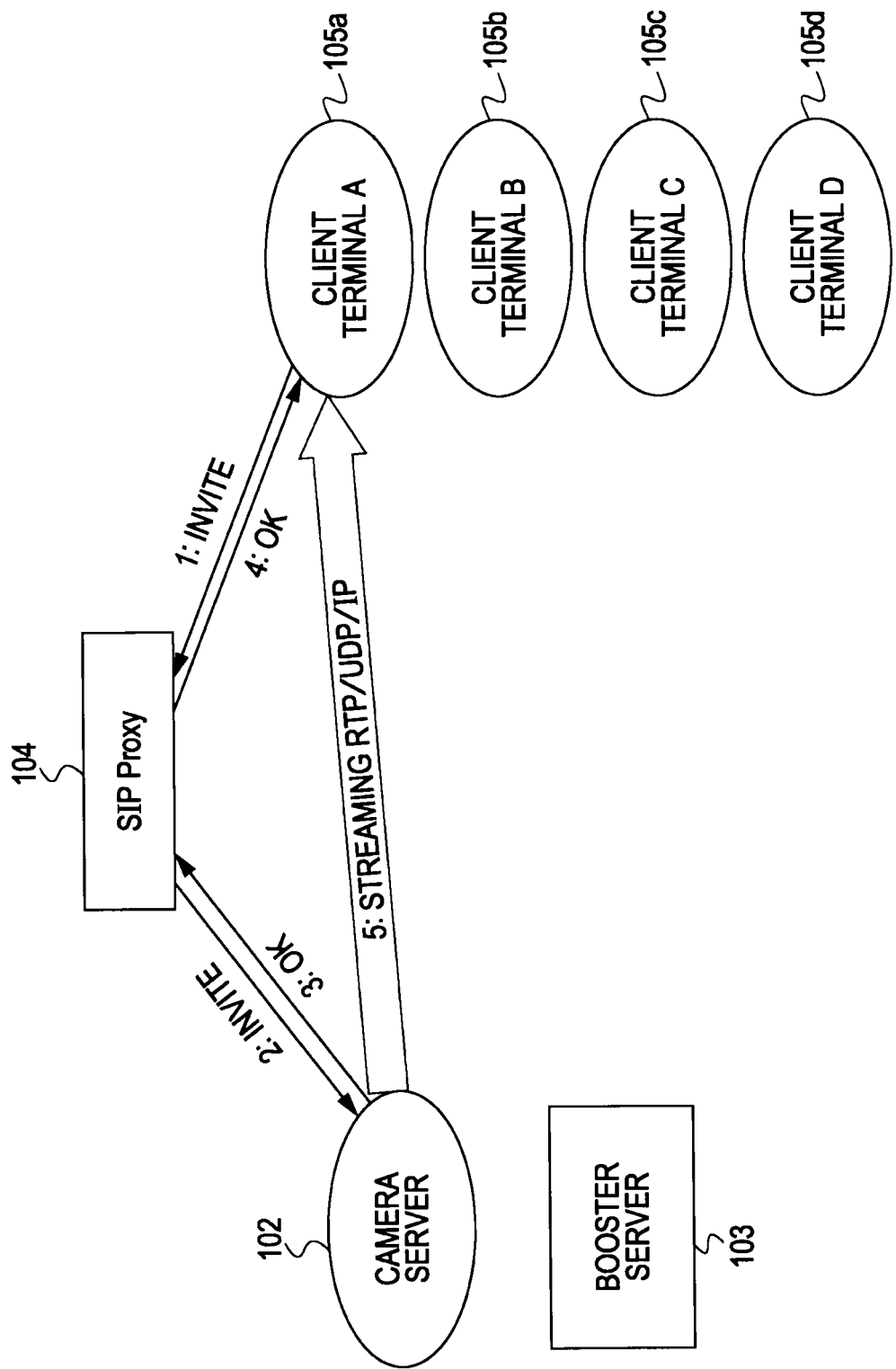
FIG. 4 is a block diagram illustrating an example of a first operation of the content delivery system.
Figure 5:
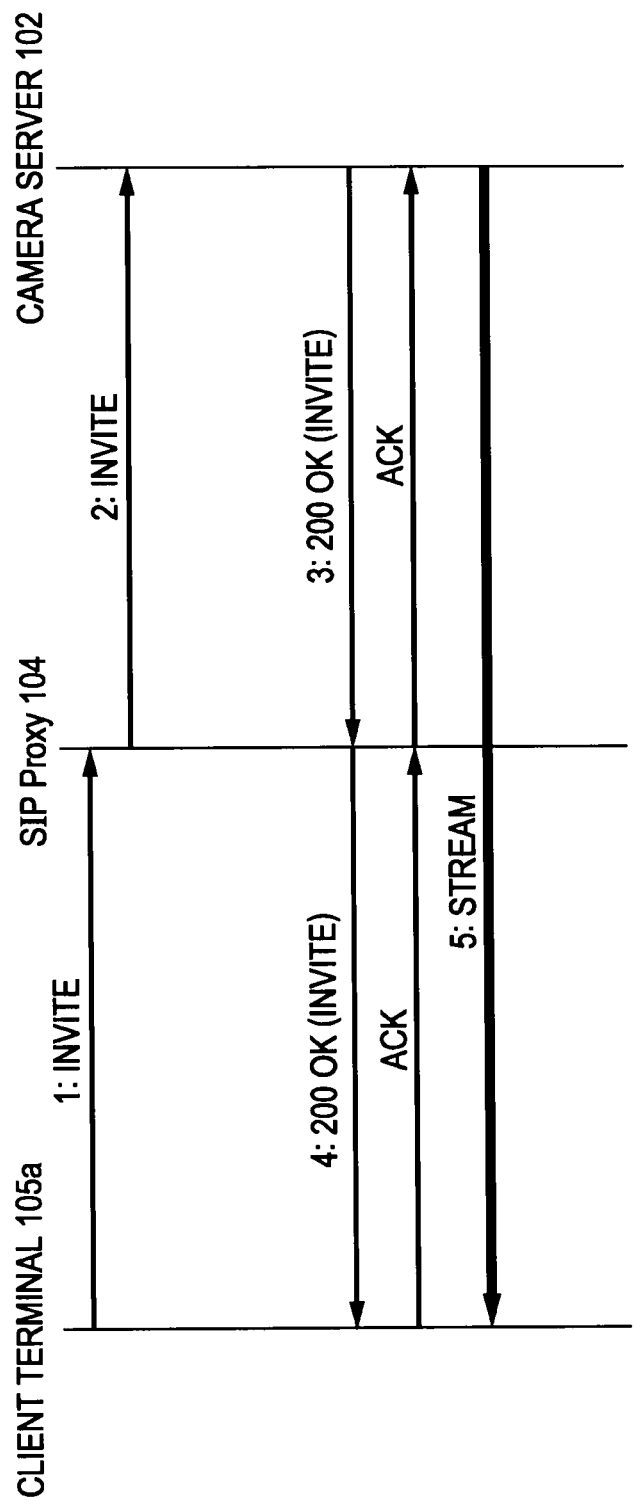
FIG. 5 is a sequence diagram illustrating the example of the first operation of the content delivery system.

An example of an operation of the content delivery system 100 shown in FIG. 1 will now be described. Referring to FIGS. 4 and 5, an example of an operation in which the client terminal (client terminal A) 105a transmits a delivery request to the camera server 102 will be described.

(1) The client terminal 105a transmits an INVITE method (delivery request) serving as a session start request to the SIP proxy server 104. (2) The SIP proxy server 104 transfers the INVITE method supplied from the client terminal 105a to the camera server 102. The camera server 102 receives the INVITE method supplied from the SIP proxy server 104.

(3) The camera server 102 determines that the camera server 102 itself is available for a delivery operation in response to the received INVITE method, and transmits a 200-OK response code representing acceptance of the delivery request corresponding to the INVITE method to the SIP proxy server 104. (4) The SIP proxy server 104 transfers the 200-OK response code supplied from the camera server 102 to the client terminal 105a. The client terminal 105a receives the 200-OK response code supplied from the SIP proxy server 104.

Then, the client terminal 105a transmits an ACK method representing reception of the 200-OK response code to the SIP proxy server 104. The SIP proxy server 104 transfers the ACK method supplied from the client terminal 105a to the camera server 102. The camera server 102 receives the ACK method supplied from the SIP proxy server 104.

(5) In this way, a session between the client terminal 105a and the camera server 102 is established, and the camera server 102 transmits (delivers) image pickup data (stream) representing content to the client terminal 105a. Note that an RTP (Real-Time Transport Protocol: IETF RFC 1890) is employed as a protocol for transmitting the image pickup data (stream).

Figure 6:
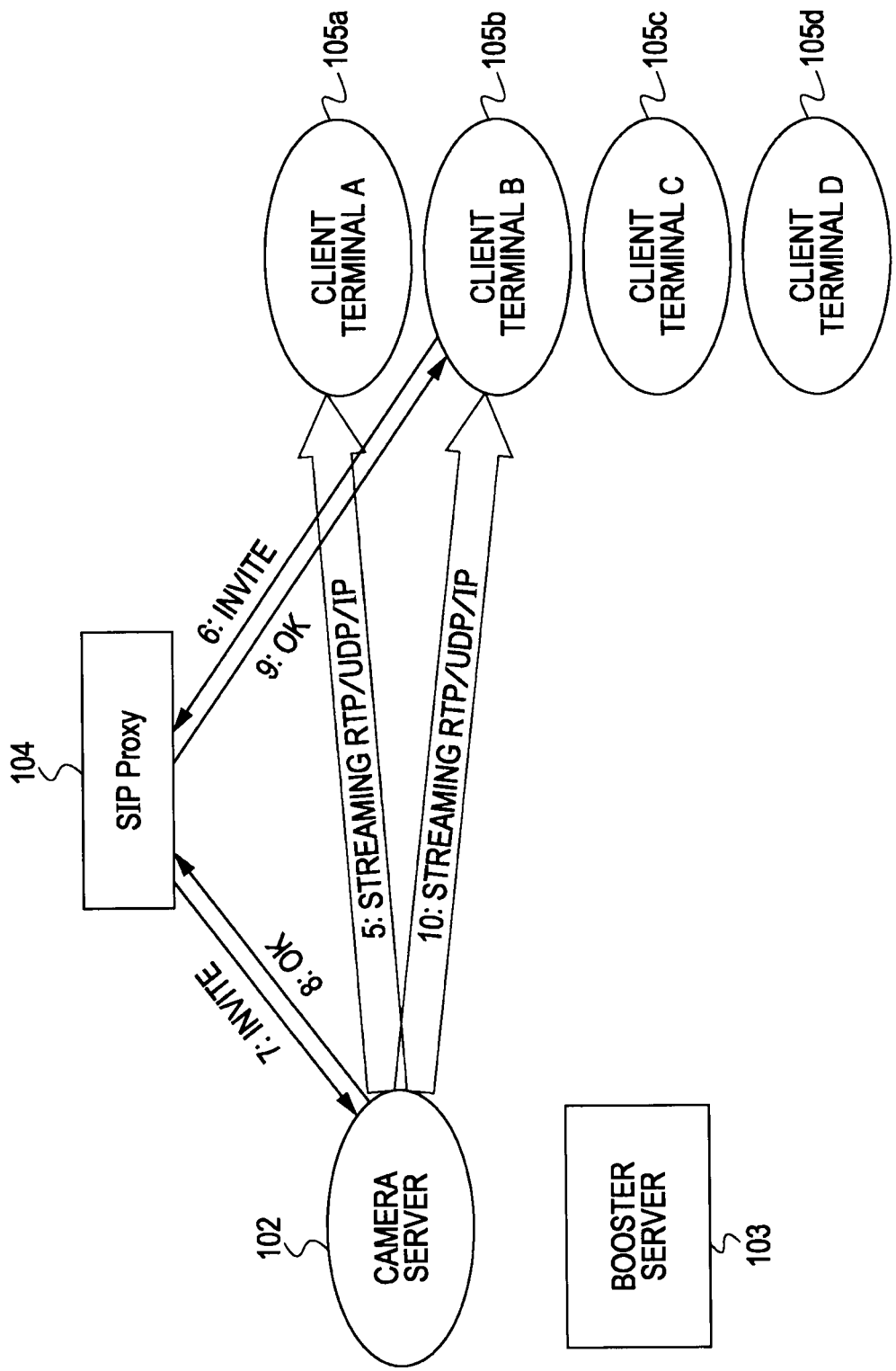
FIG. 6 is a block diagram illustrating an example of a second operation of the content delivery system.
Figure 7:
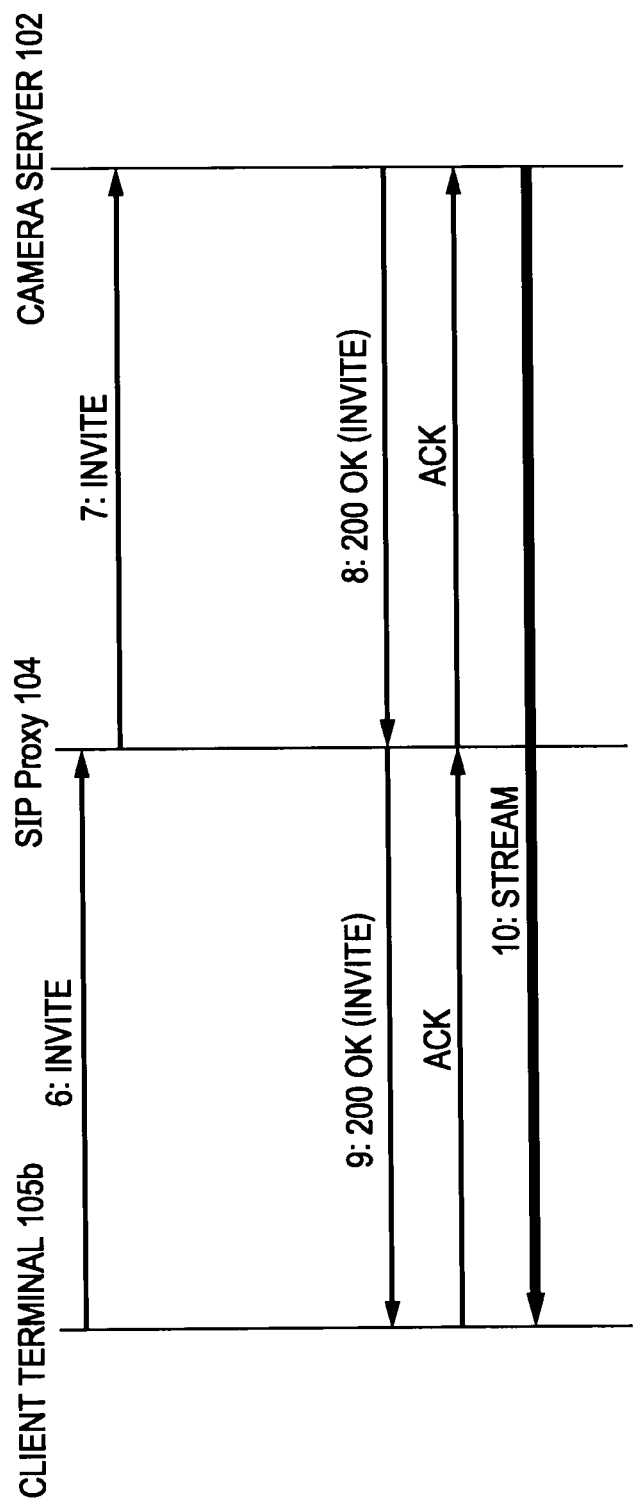
FIG. 7 is a sequence diagram illustrating the example of the second operation of the content delivery system.

Referring now to FIGS. 6 and 7, an example of an operation in which the client terminal (client terminal B) 105b transmits a delivery request to the camera server 102 while the image pickup data (content) is delivered from the camera server 102 to the client terminal 105a will be described.

(6) The client terminal 105b transmits an INVITE method (delivery request) serving as a session start request to the SIP proxy server 104. (7) The SIP proxy server 104 transfers the INVITE method supplied from the client terminal 105b to the camera server 102. The camera server 102 receives the INVITE method supplied from the SIP proxy server 104.

(8) The camera server 102 determines that the camera server 102 itself is available for a delivery operation in response to the received INVITE method, and transmits a 200-OK response code representing acceptance of the delivery request corresponding to the INVITE method to the SIP proxy server 104. (9) The SIP proxy server 104 transfers the 200-OK response code supplied from the camera server 102 to the client terminal 105*b*. The client terminal 105*b* receives the 200-OK response code supplied from the SIP proxy server 104.

Then, the client terminal 105*b* transmits an ACK method representing reception of the 200-OK response code to the SIP proxy server 104. The SIP proxy server 104 transfers the ACK method supplied from the client terminal 105*b* to the camera server 102. The camera server 102 receives the ACK method supplied from the SIP proxy server 104.

(10) In this way, a session between the client terminal 105*b* and the camera server 102 is established, and the camera server 102 transmits (delivers) image pickup data (stream) representing content to the client terminal 105*b*.

Figure 8:
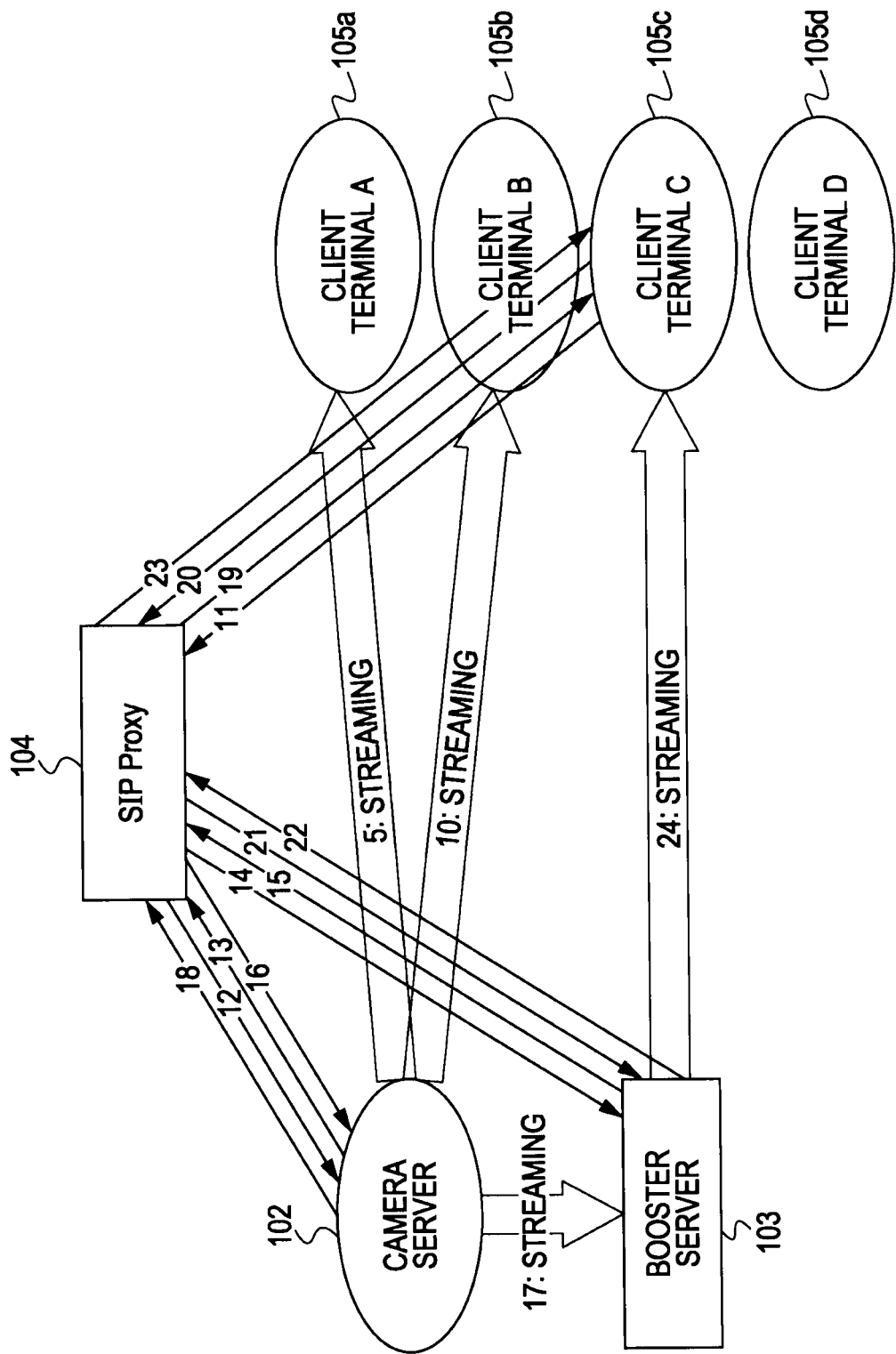
FIG. 8 is a block diagram illustrating an example of a third operation of the content delivery system.
Figure 9:
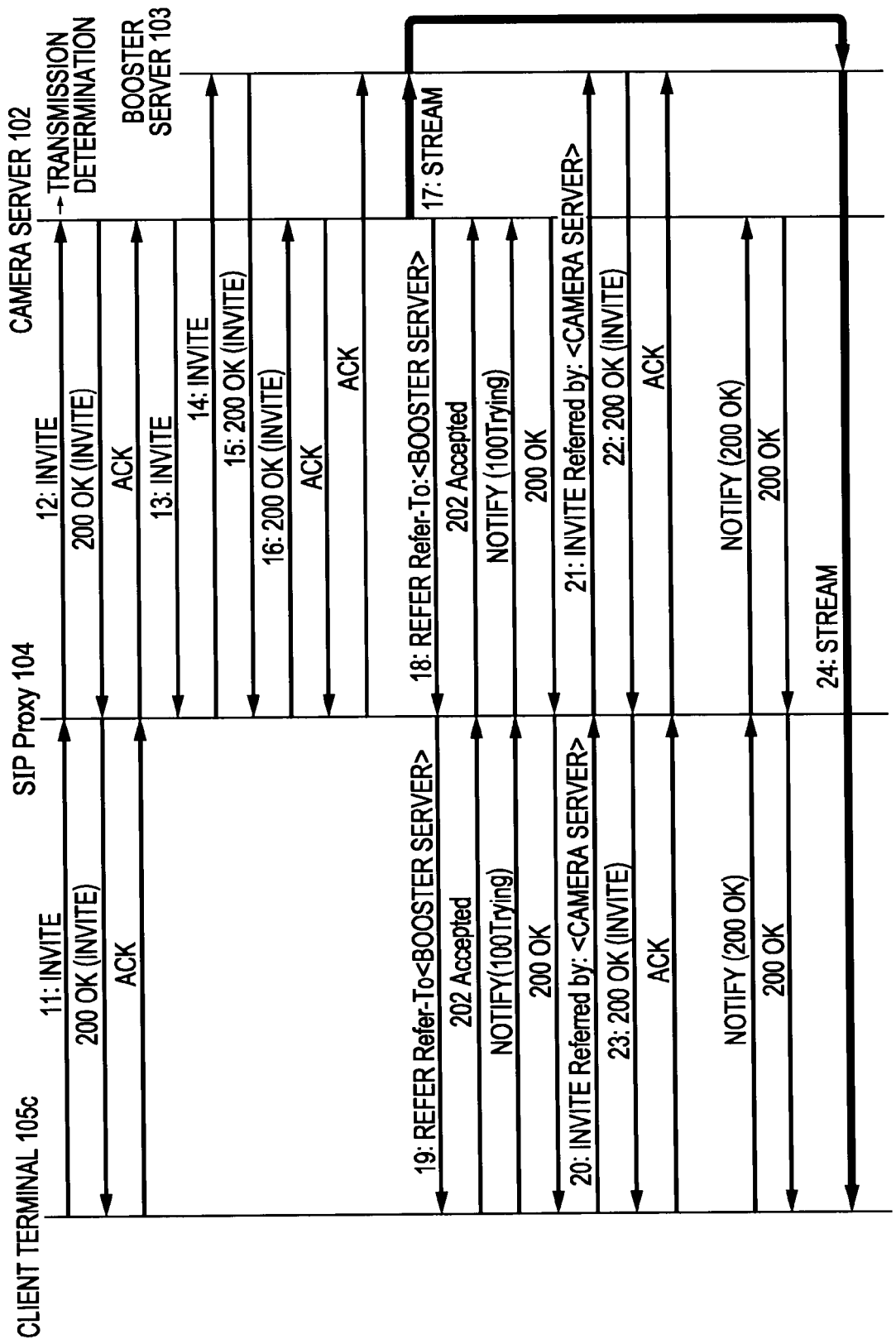
FIG. 9 is a sequence diagram illustrating the example of the third operation of the content delivery system.

Referring now to FIGS. 8 and 9, an example of an operation in which the client terminal (client terminal C) 105*c* transmits a delivery request to the camera server 102 while the image pickup data (content) is delivered from the camera server 102 to the client terminals 105*a* and 105*b* will be described.

(11) The client terminal 105*c* transmits an INVITE method (delivery request) serving as a session start request to the SIP proxy server 104. (12) The SIP proxy server 104 transfers the INVITE method supplied from the client terminal 105*c* to the camera server 102. The camera server 102 receives the INVITE method supplied from the SIP proxy server 104.

Although the camera server 102 determines that the camera server 102 itself is not available for a delivery operation in response to the received INVITE method, the camera server 102 transmits a 200-OK response code representing acceptance of the delivery request corresponding to the INVITE method to the SIP proxy server 104. The SIP proxy server 104 transfers the 200-OK response code supplied from the camera server 102 to the client terminal 105*c*. The client terminal 105*c* receives the 200-OK response code supplied from the SIP proxy server 104.

Then, the client terminal 105*c* transmits an ACK method representing acceptance of the 200-OK response code to the SIP proxy server 104. The SIP proxy server 104 transfers the ACK method supplied from the client terminal 105*c* to the camera server 102. The camera server 102 receives the ACK method supplied from the SIP proxy server 104.

(13) Since the camera server 102 determined that the camera server 102 itself is not available for a delivery operation as described above, the camera server 102 transmits an INVITE method serving as a session start request to the SIP proxy server 104. (14) The SIP proxy server 104 transfers the INVITE method supplied from the camera server 102 to the booster server 103. The booster server 103 receives the INVITE method supplied from the SIP proxy server 104.

(15) The booster server 103 transmits a 200-OK response code representing acceptance of the session start request corresponding to the INVITE method to the SIP proxy server 104. (16) The SIP proxy server 104 transfers the 200-OK response code supplied from the booster server 103 to the camera server 102. The camera server 102 receives the 200-OK response code supplied from the SIP proxy server 104.

Then, the camera server 102 transmits an ACK method representing reception of the 200-OK response code to the SIP proxy server 104. The SIP proxy server 104 transfers the ACK method supplied from the camera server 102 to the booster server 103. The booster server 103 receives the ACK method supplied from the SIP proxy server 104.

(17) In this way, a session between the camera server 102 and the booster server 103 is established, and the camera server 102 transmits image pickup data (stream) representing content to the booster server 103.

(18) The camera server 102 transmits a REFER method serving as a transfer command including information on the booster server 103 to the SIP proxy server 104. (19) The SIP proxy server 104 transfers the REFER method supplied from the camera server 102 to the client terminal 105*c*. The client terminal 105*c* receives the REFER method supplied from the SIP proxy server 104.

The client terminal 105*c* transmits a 202-Accepted response code representing agreement of the transfer request to the SIP proxy server 104. The SIP proxy server 104 transmits the 202-Accepted response code supplied from the client terminal 105*c* to the camera server 102. The camera server 102 receives the 202-Accepted response code supplied from the SIP proxy server 104.

The client terminal 105*c* transmits a NOTIFY method representing that a transfer operation is being performed to the SIP proxy server 104. The SIP proxy server 104 transfers the NOTIFY method supplied from the client terminal 105*c* to the camera server 102. The camera server 102 receives the NOTIFY method supplied from the SIP proxy server 104.

Then, the camera server 102 transmits a 200-OK response code representing acceptance of notification represented by the received NOTIFY method to the SIP proxy server 104. The SIP proxy server 104 transfers the 200-OK response code supplied from the camera server 102 to the client terminal 105*c*. The client terminal 105*c* receives the 200-OK response code supplied from the SIP proxy server 104.

(20) Then, the client terminal 105*c* transmits an INVITE method (delivery request) serving as a session start request to the SIP proxy server 104 in response to a transfer request issued from the camera server 102. (21) The SIP proxy server 104 transfers the INVITE method supplied from the client terminal 105*c* to the booster server 103. The booster server 103 receives the INVITE method supplied from the SIP proxy server 104.

(22) The booster server 103 determines that the booster server 103 itself is available for a delivery operation in response to the received INVITE method, and transmits a 200-OK response code representing acceptance of the delivery request corresponding to the INVITE method to the SIP proxy server 104. (23) The SIP proxy server 104 transfers the 200-OK response code supplied from the booster server 103 to the client terminal 105*c*. The client terminal 105*c* receives the 200-OK response code supplied from the SIP proxy server 104.

Then, the client terminal 105*c* transmits an ACK method representing reception of the 200-OK response code to the SIP proxy server 104. The SIP proxy server 104 transfers the ACK method supplied from the client terminal 105*c* to the booster server 103. The booster server 103 receives the ACK method supplied from the SIP proxy server 104.

The client terminal 105*c* transmits a NOTIFY method representing acceptance of the delivery operation to the SIP proxy server 104. The SIP proxy server 104 transfers the NOTIFY method supplied from the client terminal 105*c* to the camera server 102. The camera server 102 receives the NOTIFY method supplied from the SIP proxy server 104.

Then, the camera server 102 transmits a 200-OK response code representing acceptance of notification represented by the received NOTIFY method to the SIP proxy server 104. The SIP proxy server 104 transfers the 200-OK response code supplied from the camera server 102 to the client terminal 105*c*. The client terminal 105*c* receives the 200-OK response code supplied from the SIP proxy server 104.

(24) In this way, a session between the client terminal 105c and the booster server 103 is established, and the booster server 103 transmits (delivers) image pickup data (stream) representing content supplied from the camera server 102 to the client terminal 105c.

Figure 10:
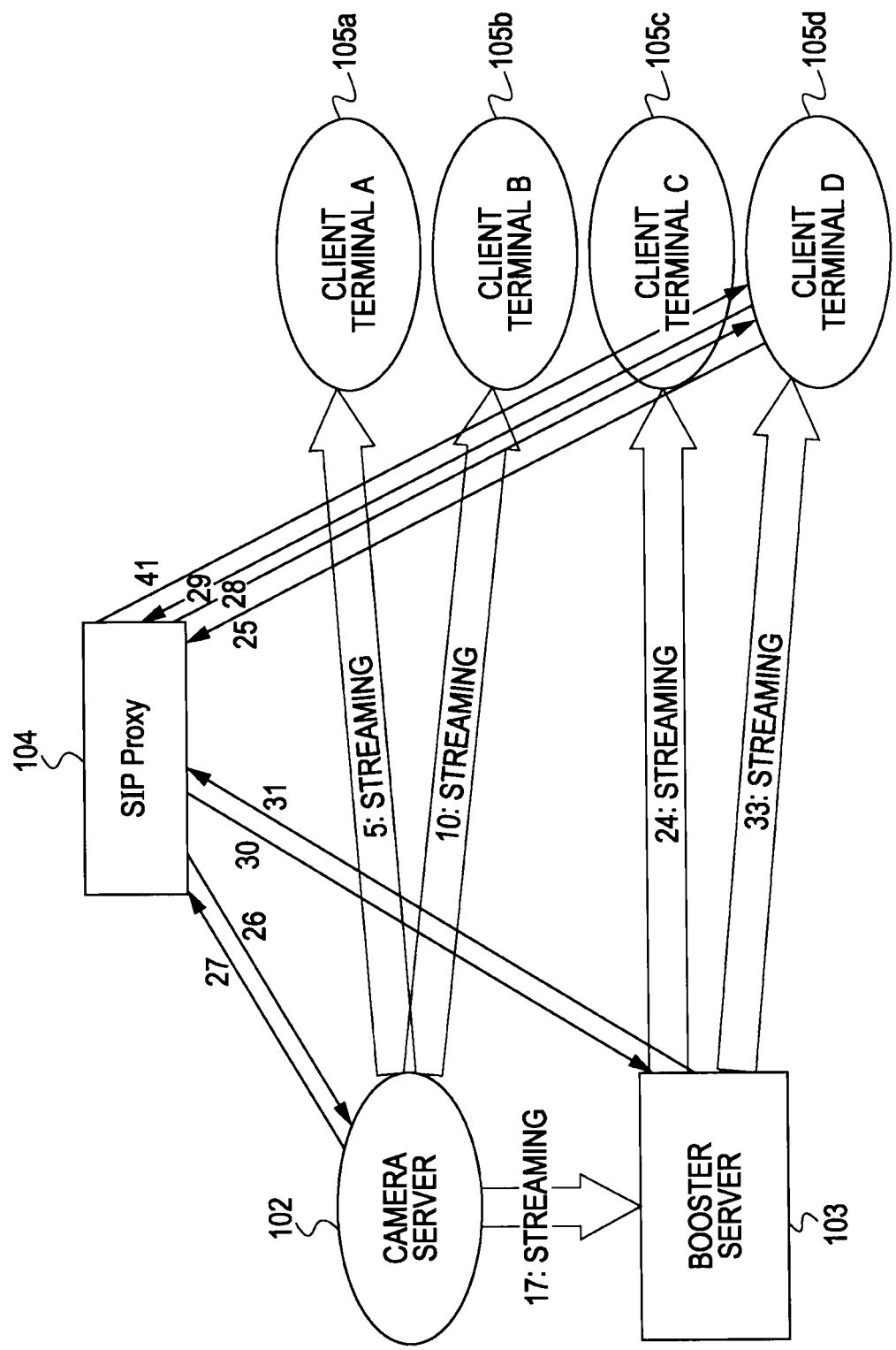
FIG. 10 is a block diagram illustrating an example of a fourth operation of the content delivery system.
Figure 11:
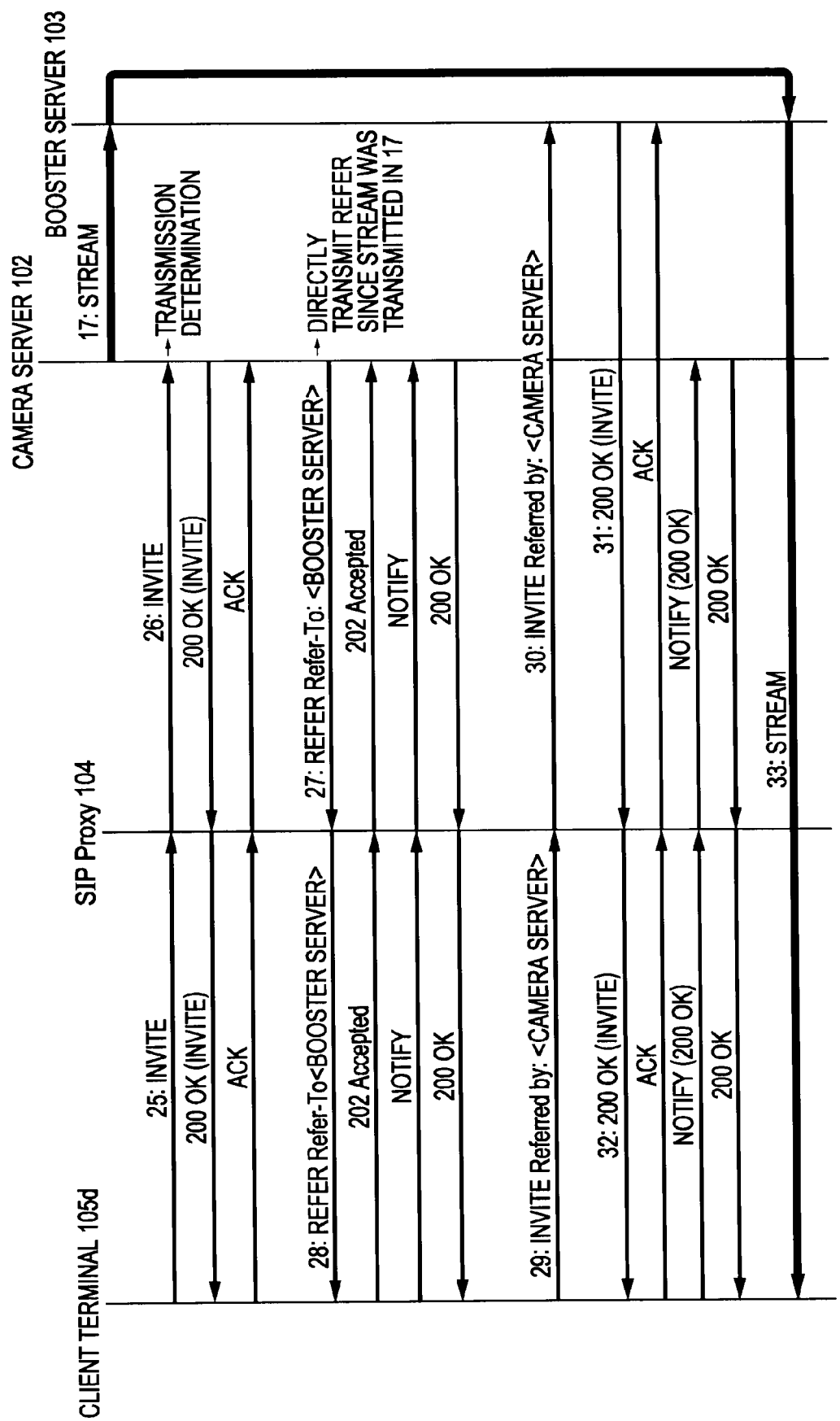
FIG. 11 is a sequence diagram illustrating the example of the fourth operation of the content delivery system.

Referring to FIGS. 10 and 11, an example of an operation in which the client terminal (client terminal D) 105d transmits a delivery request to the camera server 102 while image pickup data (content) is delivered from the camera server 102 to the client terminals 105a and 105b and image pickup data is delivered from the booster server 103 to the client terminal 105c will be described.

(25) The client terminal 105d transmit an INVITE method (delivery request) serving as a session start request to the SIP proxy server 104. (26) The SIP proxy server 104 transfers the INVITE method supplied from the client terminal 105d to the camera server 102. The camera server 102 receives the INVITE method supplied from the SIP proxy server 104.

Although the camera server 102 determines that the camera server 102 itself is not available for a delivery operation in response to the received INVITE method, the camera server 102 transmits a 200-OK response code representing acceptance of the delivery request corresponding to the INVITE method to the SIP proxy server 104. The SIP proxy server 104 transfers the 200-OK response code supplied from the camera server 102 to the client terminal 105d. The client terminal 105d receives the 200-OK response code supplied from the SIP proxy server 104.

Then, the client terminal 105d transmits an ACK method representing reception of the 200-OK response code to the SIP proxy server 104. The SIP proxy server 104 transfers the ACK method supplied from the client terminal 105d to the camera server 102. The camera server 102 receives the ACK method supplied from the SIP proxy server 104.

(27) Since the camera server 102 determined that the camera server 102 itself is not available for a delivery operation as described above, the camera server 102 transmits a REFER method serving as a transfer command including information on the booster server 103 to the SIP proxy server 104. (28) The SIP proxy server 104 transfers the REFER method supplied from the camera server 102 to the client terminal 105d. The client terminal 105d receives the REFER method supplied from the SIP proxy server 104.

The client terminal 105d transmits a 202-Accepted response code representing agreement of the transfer request to the SIP proxy server 104. The SIP proxy server 104 transmits the 202-Accepted response code supplied from the client terminal 105d to the camera server 102. The camera server 102 receives the 202-Accepted response code supplied from the SIP proxy server 104.

The client terminal 105d transmits a NOTIFY method representing that a transfer operation is being performed to the SIP proxy server 104. The SIP proxy server 104 transfers the NOTIFY method supplied from the client terminal 105d to the camera server 102. The camera server 102 receives the NOTIFY method supplied from the SIP proxy server 104.

Then, the camera server 102 transmits a 200-OK response code representing reception of notification represented by the received NOTIFY method to the SIP proxy server 104. The SIP proxy server 104 transfers the 200-OK response code supplied from the camera server 102 to the client terminal 105d. The client terminal 105d receives the 200-OK response code supplied from the SIP proxy server 104.

(29) Then, the client terminal 105d transmits an INVITE method (delivery request) serving as a session start request to the SIP proxy server 104 in response to a transfer request issued from the camera server 102. (30) The SIP proxy server 104 transfers the INVITE method supplied from the client terminal 105d to the booster server 103. The booster server 103 receives the INVITE method supplied from the SIP proxy server 104.

(31) The booster server 103 determines that the booster server 103 itself is available for a delivery operation in response to the received INVITE method, and transmits a 200-OK response code representing acceptance of the delivery request corresponding to the INVITE method to the SIP proxy server 104. (32) The SIP proxy server 104 transfers the 200-OK response code supplied from the booster server 103 to the client terminal 105d. The client terminal 105d receives the 200-OK response code supplied from the SIP proxy server 104.

Then, the client terminal 105d transmits an ACK method representing reception of the 200-OK response code to the SIP proxy server 104. The SIP proxy server 104 transfers the ACK method supplied from the client terminal 105c to the booster server 103. The booster server 103 receives the ACK method supplied from the SIP proxy server 104.

The client terminal 105d transmits a NOTIFY method representing acceptance of the delivery request to the SIP proxy server 104. The SIP proxy server 104 transfers the NOTIFY method supplied from the client terminal 105d to the camera server 102. The camera server 102 receives the NOTIFY method supplied from the SIP proxy server 104.

Then, the camera server 102 transmits a 200-OK response code representing reception of notification represented by the received NOTIFY method to the SIP proxy server 104. The SIP proxy server 104 transfers the 200-OK response code supplied from the camera server 102 to the client terminal 105d. The client terminal 105d receives the 200-OK response code supplied from the SIP proxy server 104.

(33) In this way, a session between the client terminal 105d and the booster server 103 is established, and the booster server 103 transmits (delivers) image pickup data (stream) representing content supplied from the camera server 102 to the client terminal 105d.

Figure 12:
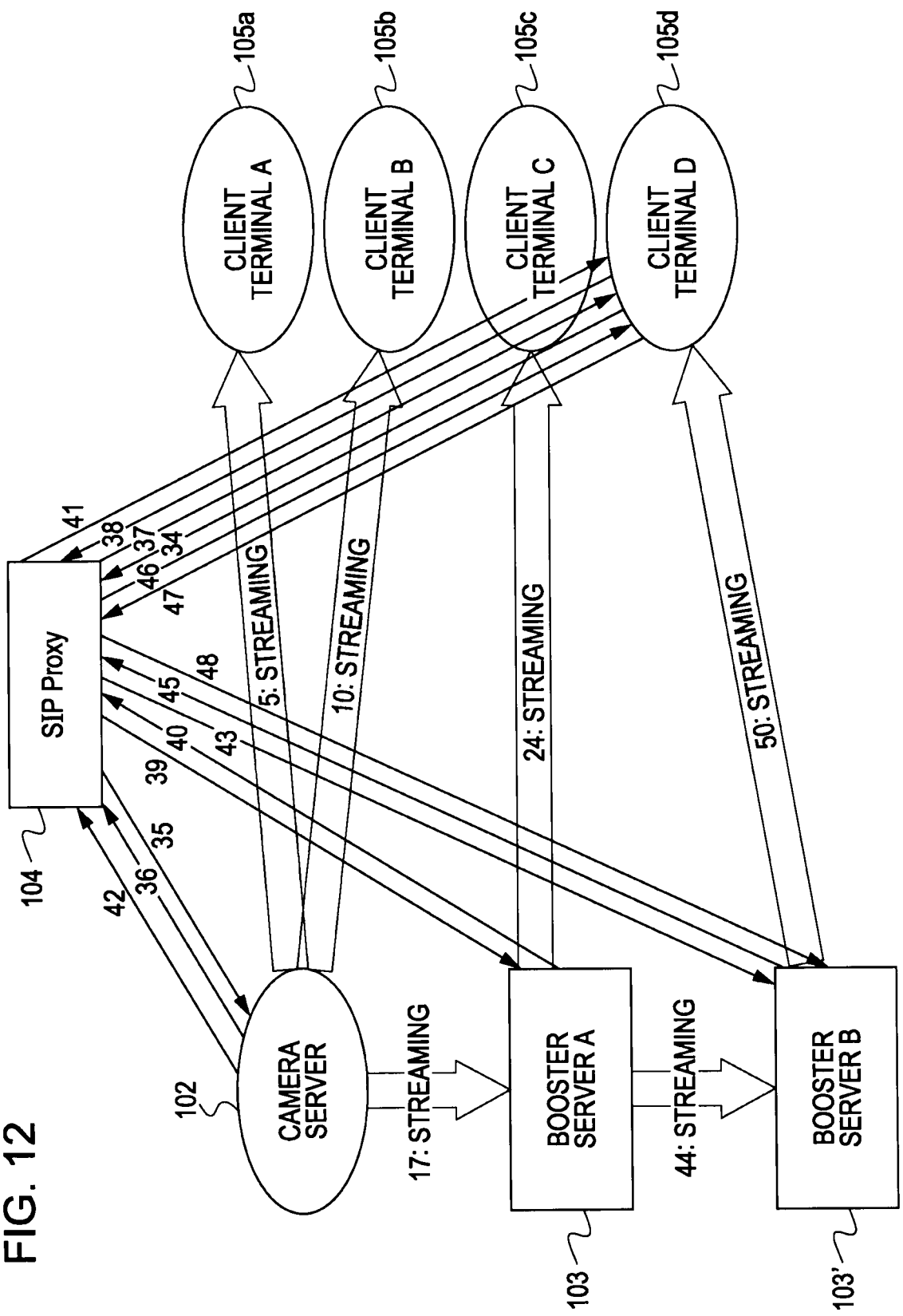
FIG. 12 is a block diagram illustrating an example of a fifth operation of the content delivery system.
Figure 13:
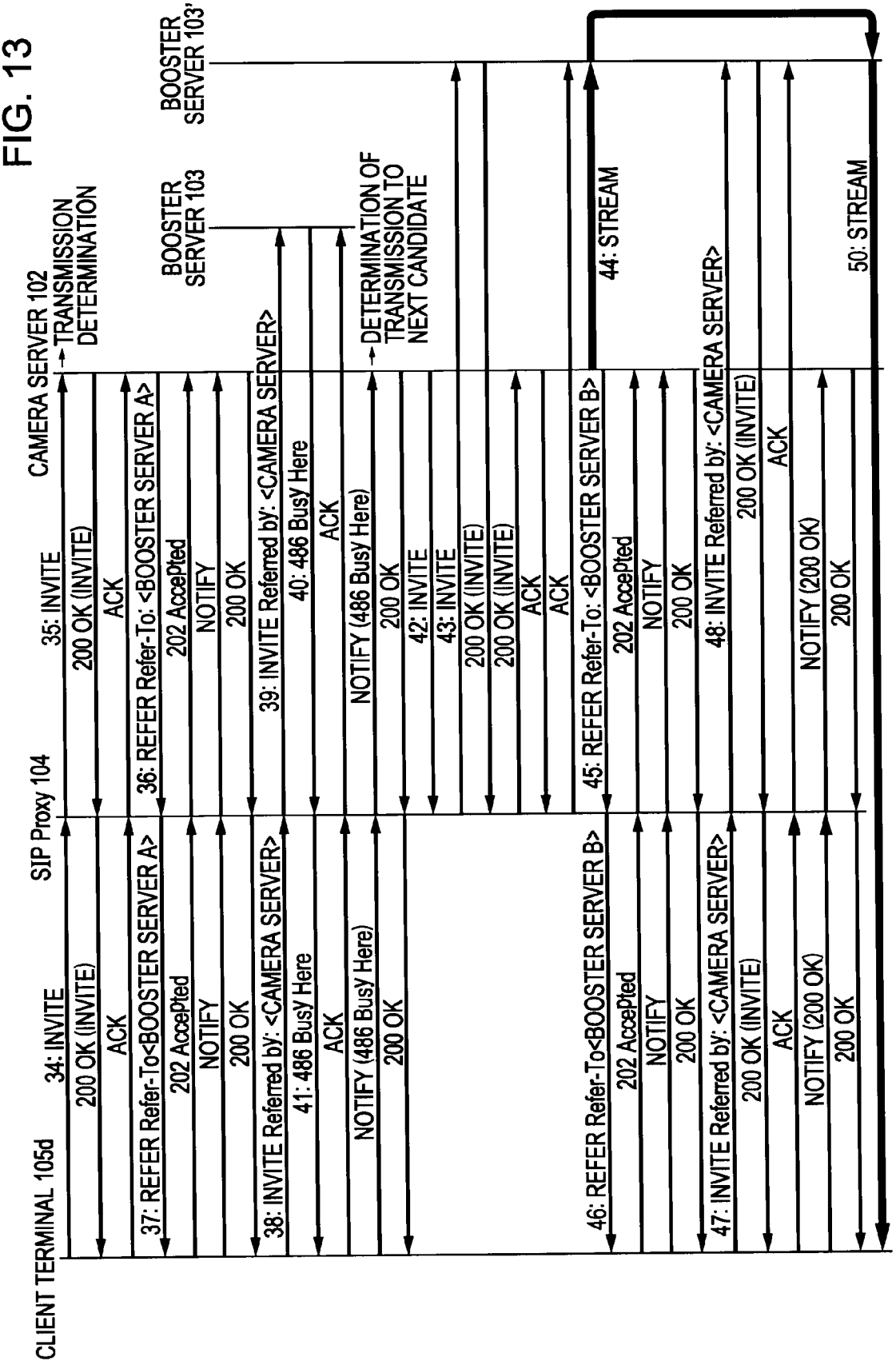
FIG. 13 is a sequence diagram illustrating the example of the fifth operation of the content delivery system.

Referring to FIGS. 12 and 13, another example of an operation in which the client terminal (client terminal D) 105d transmits a delivery request to the camera server 102 while image pickup data (content) is delivered from the camera server 102 to the client terminals 105a and 105b and image pickup data is delivered from the booster server 103 to the client terminal 105c will be described. This example is different from the example shown in FIGS. 10 and 11 in that content may not be delivered from the booster server (booster server A) 103 to the client terminal 105d but delivered from another booster server (booster server B) 103' to the client terminal 105d.

(34) The client terminal 105d transmits an INVITE method (delivery request) serving as a session start request to the SIP proxy server 104. (35) The SIP proxy server 104 transfers the INVITE method supplied from the client terminal 105d to the camera server 102. The camera server 102 receives the INVITE method supplied from the SIP proxy server 104.

Although the camera server 102 determines that the camera server 102 itself is not available for a delivery operation in response to the received INVITE method, the camera server 102 transmits a 200-OK response code representing acceptance of the delivery request corresponding to the INVITE method to the SIP proxy server 104. The SIP proxy server 104 transfers the 200-OK response code supplied from the camera server 102 to the client terminal 105d. The client terminal 105d receives the 200-OK response code supplied from the SIP proxy server 104.

Then, the client terminal 105d transmits an ACK method representing reception of the 200-OK response code to the SIP proxy server 104. The SIP proxy server 104 transfers the ACK method supplied from the client terminal 105d to the camera server 102. The camera server 102 receives the ACK method supplied from the SIP proxy server 104.

(36) Since the camera server 102 determined that the camera server 102 itself is not available for a delivery operation as described above, the camera server 102 transmits a REFER method which includes information on the booster server 103 and which serves as a transfer command to the SIP proxy server 104. (37) The SIP proxy server 104 transfers the REFER method supplied from the camera server 102 to the client terminal 105d. The client terminal 105d receives the REFER method supplied from the SIP proxy server 104.

The client terminal 105d transmits a 202-Accepted response code representing agreement of the transfer request to the SIP proxy server 104. The SIP proxy server 104 transmits the 202-Accepted response code supplied from the client terminal 105d to the camera server 102. The camera server 102 receives the 202-Accepted response code supplied from the SIP proxy server 104.

The client terminal 105d transmits a NOTIFY method representing that a transfer operation is being performed to the SIP proxy server 104. The SIP proxy server 104 transfers the NOTIFY method supplied from the client terminal 105d to the camera server 102. The camera server 102 receives the NOTIFY method supplied from the SIP proxy server 104.

Then, the camera server 102 transmits a 200-OK response code representing reception of notification represented by the received NOTIFY method to the SIP proxy server 104. The SIP proxy server 104 transfers the 200-OK response code supplied from the camera server 102 to the client terminal 105d. The client terminal 105d receives the 200-OK response code supplied from the SIP proxy server 104.

(38) Then, the client terminal 105d transmits an INVITE method (delivery request) serving as a session start request to the SIP proxy server 104 in response to a transfer request issued from the camera server 102. (39) The SIP proxy server 104 transfers the INVITE method supplied from the client terminal 105d to the booster server 103. The booster server 103 receives the INVITE method supplied from the SIP proxy server 104.

(40) When the booster server 103 determines that the booster server 103 itself is not available for a delivery operation in response to the received INVITE method since the booster server 103 is in a busy state, the booster server 103 transmits a 486-BusyHere response code representing the busy state to the SIP proxy server 104.

(41) The SIP proxy server 104 transfers the 486-BusyHere response code supplied from the booster server 103 to the client terminal 105d. The client terminal 105d receives the 486-BusyHere response code supplied from the SIP proxy server 104.

Then, the client terminal 105d transmits an ACK method representing reception of the 486-BusyHere response code to the SIP proxy server 104. The SIP proxy server 104 transfers the ACK method supplied from the client terminal 105d to the booster server 103. The booster server 103 receives the ACK method supplied from the SIP proxy server 104.

The client terminal 105d transmits a NOTIFY method representing that the delivery request was not accepted due to the busy state to the SIP proxy server 104. The SIP proxy server 104 transfers the NOTIFY method supplied from the client terminal 105d to the camera server 102. The camera server 102 receives the NOTIFY method supplied from the SIP proxy server 104.

Then, the camera server 102 transmits a 200-OK response code representing acceptance of notification represented by the received NOTIFY method to the SIP proxy server 104. The SIP proxy server 104 transfers the 200-OK response code supplied from the camera server 102 to the client terminal 105d. The client terminal 105d receives the 200-OK response code supplied from the SIP proxy server 104.

(42) Then, the camera server 102 transmits an INVITE method serving as a session start request to the SIP proxy server 104 so that another booster server 103' performs a delivery operation instead of the camera server 102. (43) The SIP proxy server 104 transfers the INVITE method supplied from the camera server 102 to the booster server 103'. The booster server 103' receives the INVITE method supplied from the SIP proxy server 104.

Then, the booster server 103' transmits a 200-OK response code representing acceptance of the session start request in response to the received INVITE method to the SIP proxy server 104. The SIP proxy server 104 transfers the 200-OK response code supplied from the booster server 103' to the camera server 102. The camera server 102 receives the 200-OK response code supplied from the SIP proxy server 104.

Then, the camera server 102 transmits an ACK method representing reception of the 200-OK response code to the SIP proxy server 104. The SIP proxy server 104 transfers the ACK method supplied from the camera server 102 to the booster server 103'. The booster server 103' receives the ACK method supplied from the SIP proxy server 104.

(44) In this way, a session between the camera server 102 and the booster server 103' is established, and the camera server 102 transmits image pickup data (stream) representing content to the booster server 103'.

(45) The camera server 102 transmits a REFER method serving as a transfer command including information on the booster server 103' to the SIP proxy server 104. (46) The SIP proxy server 104 transfers the REFER method supplied from the camera server 102 to the client terminal 105d. The client terminal 105d receives the REFER method supplied from the SIP proxy server 104.

The client terminal 105d transmits a 202-Accepted response code representing agreement of the transfer request to the SIP proxy server 104. The SIP proxy server 104 transmits the 202-Accepted response code supplied from the client terminal 105d to the camera server 102. The camera server 102 receives the 202-Accepted response code supplied from the SIP proxy server 104.

The client terminal 105d transmits a NOTIFY method representing that a transfer operation is being performed to the SIP proxy server 104. The SIP proxy server 104 transfers the NOTIFY method supplied from the client terminal 105d to the camera server 102. The camera server 102 receives the NOTIFY method supplied from the SIP proxy server 104.

Then, the camera server 102 transmits a 200-OK response code representing reception of notification represented by the received NOTIFY method to the SIP proxy server 104. The SIP proxy server 104 transfers the 200-OK response code supplied from the camera server 102 to the client terminal 105d. The client terminal 105d receives the 200-OK response code supplied from the SIP proxy server 104.

(47) Then, the client terminal 105d transmits an INVITE method (delivery request) serving as a session start request to the SIP proxy server 104 in response to a transfer request issued from the camera server 102. (48) The SIP proxy server 104 transfers the INVITE method supplied from the client terminal 105d to the booster server 103'. The booster server 103' receives the INVITE method supplied from the SIP proxy server 104.

The booster server 103' determines that the booster server 103' itself is available for a delivery operation in response to the received INVITE method, and transmits a 200-OK response code representing acceptance of the delivery request corresponding to the INVITE method to the SIP proxy server 104. The SIP proxy server 104 transfers the 200-OK response code supplied from the booster server 103' to the client terminal 105d. The client terminal 105d receives the 200-OK response code supplied from the SIP proxy server 104.

Then, the client terminal 105d transmits an ACK method representing reception of the 200-OK response code to the SIP proxy server 104. The SIP proxy server 104 transfers the ACK method supplied from the client terminal 105d to the booster server 103'. The booster server 103' receives the ACK method supplied from the SIP proxy server 104.

The client terminal 105d transmits a NOTIFY method representing acceptance of the delivery request to the SIP proxy server 104. The SIP proxy server 104 transfers the NOTIFY method supplied from the client terminal 105d to the camera server 102. The camera server 102 receives the NOTIFY method supplied from the SIP proxy server 104.

Then, the camera server 102 transmits a 200-OK response code representing acceptance of notification represented by the received NOTIFY method to the SIP proxy server 104. The SIP proxy server 104 transfers the 200-OK response code supplied from the camera server 102 to the client terminal 105d. The client terminal 105d receives the 200-OK response code supplied from the SIP proxy server 104.

(50) In this way, a session between the client terminal 105d and the booster server 103' is established, and the booster server 103' transmits (delivers) image pickup data (stream) representing content supplied from the camera server 102 to the client terminal 105d.

As described above, in the content delivery system 100 shown in FIG. 1, the camera server 102 itself transmits content to the client terminals when the camera server 102 is available for delivery requests supplied from the client terminals since the number of delivery requests is small. In this case, the image pickup data (content) may be delivered without using the booster server 103, and accordingly, a delivery service business may be started in a small way.

Furthermore, in the content delivery system 100 shown in FIG. 1, in a case where the camera server 102 is not available for delivery requests transmitted from the client terminals since the number of deliveries is large, the booster server 103 may be utilized for delivery of image pickup data (content) so as to flexibly address the increased number of deliveries.

Figure 14:
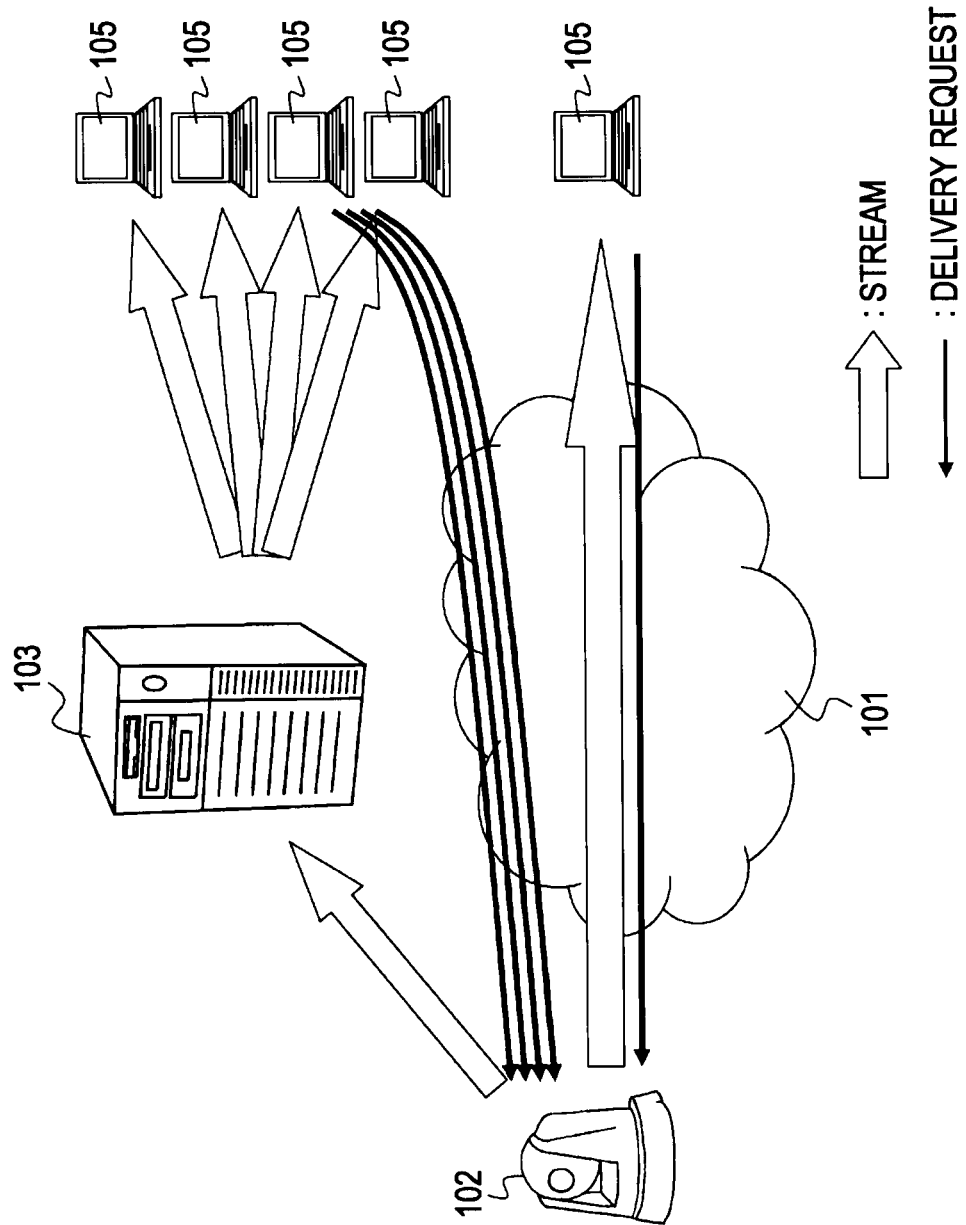
FIG. 14 is a diagram illustrating an effect of the content delivery system according to the embodiment of the present invention.

For example, as shown in FIG. 14, in a case where a single client terminal (first client terminal) 105 transmits a delivery request, image pickup data is delivered (transmitted) from a camera server 102 to the client terminal 105 in response to the delivery request, whereas in a case where a plurality of client terminals 105 including the first client terminal 105 transmit delivery requests, image pickup data is supplied to, among the plurality of client terminals 105, client terminals 105 other than the first client terminal 105 from a booster server 103 which has high delivery capability instead of the camera server 102.

Furthermore, in the content delivery system 100 shown in FIG. 1, when the booster server 103 is in a busy state, and therefore, the booster server 103 may not perform a delivery operation instead of the camera server 102, another booster server 103' (not shown in FIG. 1) may perform delivery operation instead of the camera server 102. As the number of deliveries increases, the number of booster servers may be increased.

Figure 15:
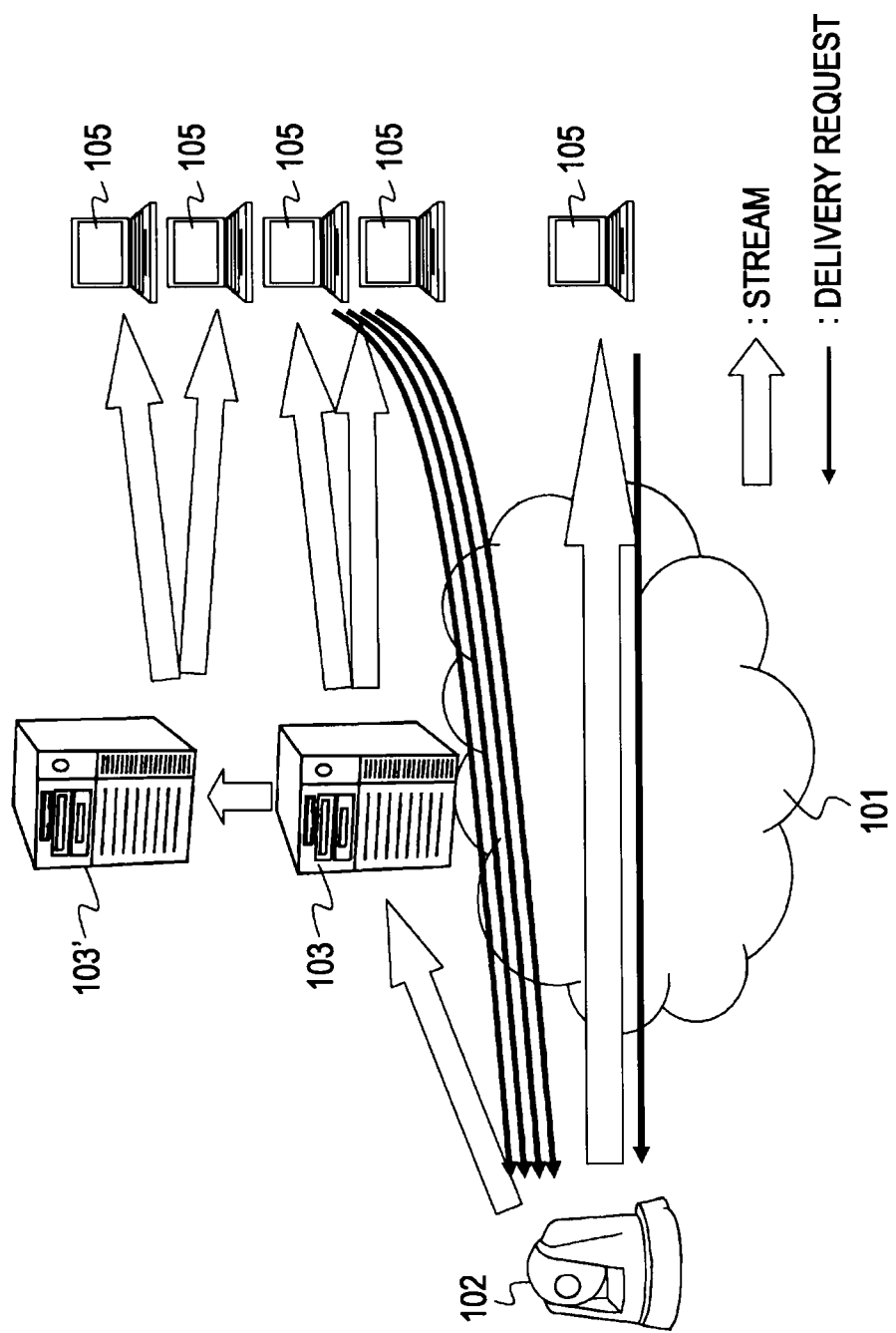
FIG. 15 is a diagram illustrating another effect of the content delivery system according to the embodiment of the present invention.

For example, as shown in FIG. 15, in a case where a single client terminal (first client terminal) 105 transmits a delivery request, image pickup data is delivered (transmitted) from a camera server 102 to the client terminal 105 in response to the delivery request, whereas in a case where a plurality of client terminals 105, i.e., first to fifth client terminals 105, transmit delivery requests, image pickup data is delivered to second and third client terminals 105 from a booster server 103 and delivered to fourth and fifth client terminals 105 from a booster server 103'.

Figure 16:
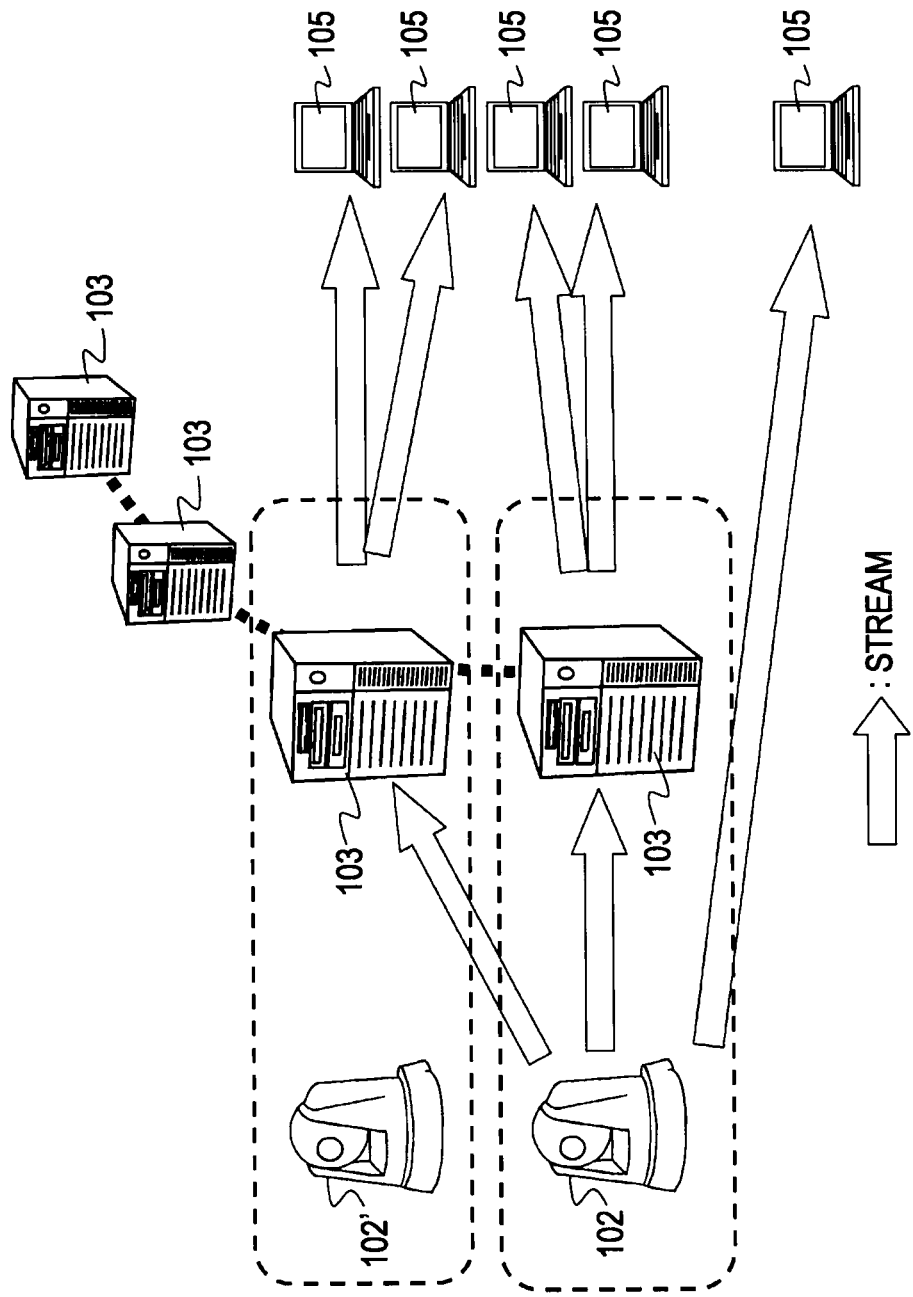
FIG. 16 is a diagram illustrating an example of a modification according to the present invention.

Note that, as shown in FIG. 16, in a case where a booster server 103 which transmits image pickup data (content) of a camera server 102' is capable of performing another delivery operation, the booster server 103 may be used. Accordingly, surplus resource is efficiently utilized and peak load may be distributed by sharing the surplus resource.

Figure 17:
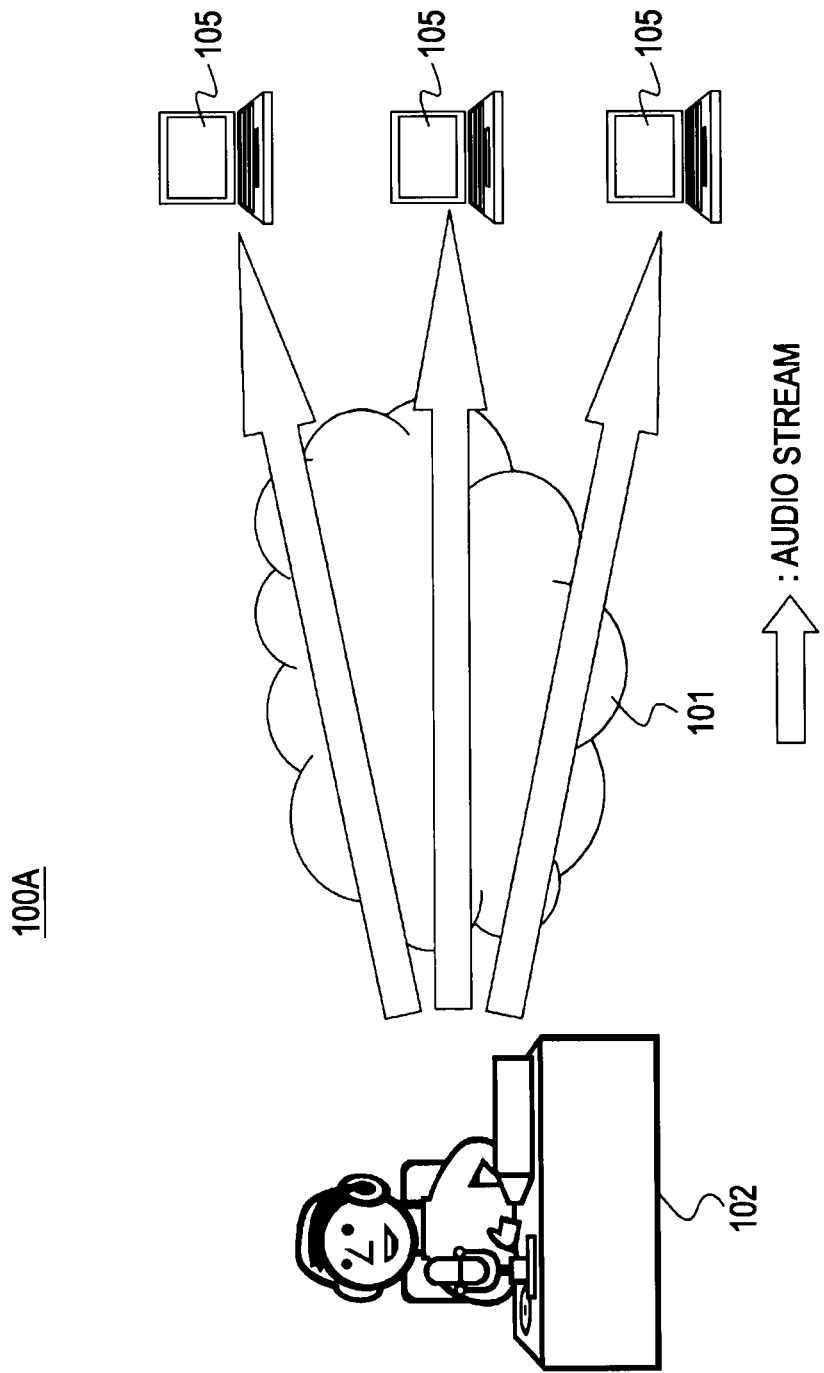
FIG. 17 is a diagram illustrating a content delivery system according to another embodiment of the present invention.
Figure 18:
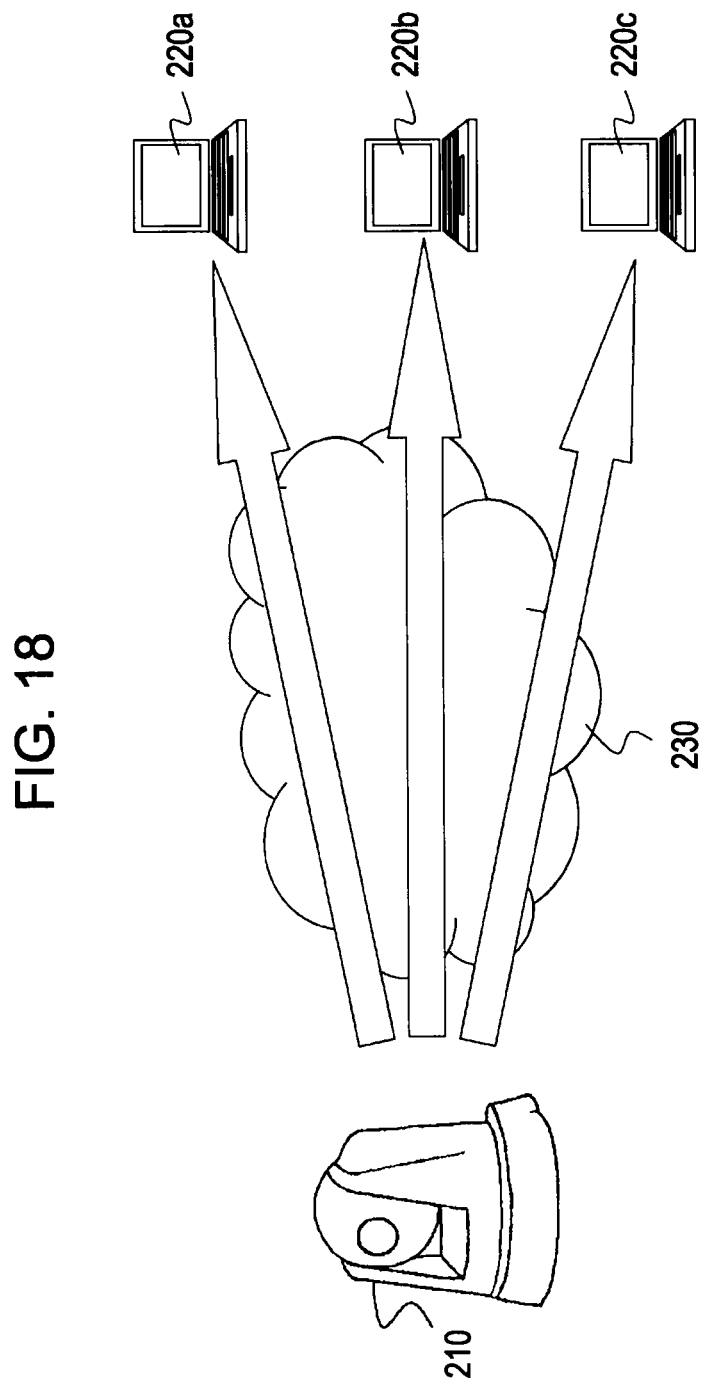
FIG. 18 is a diagram illustrating an operation of delivering image pickup data from a camera server serving as a delivery server through a network to a client terminal by streaming delivery.
Figure 19:
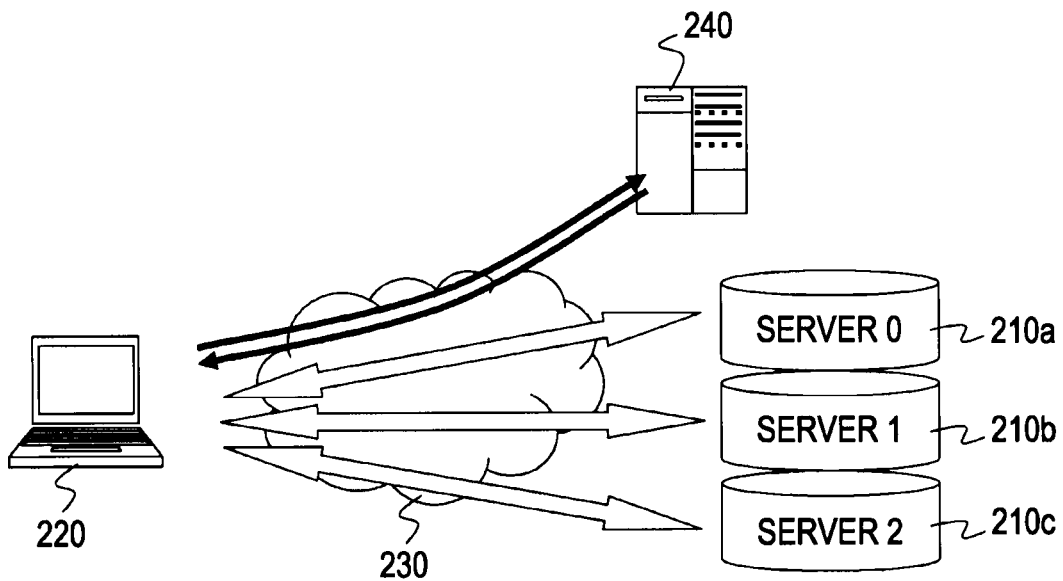
FIG. 19 is a diagram illustrating load distribution employing a DNS (Domain Name System) which is an example of a load distribution technique performed so that the number of deliveries is increased.
Figure 20:
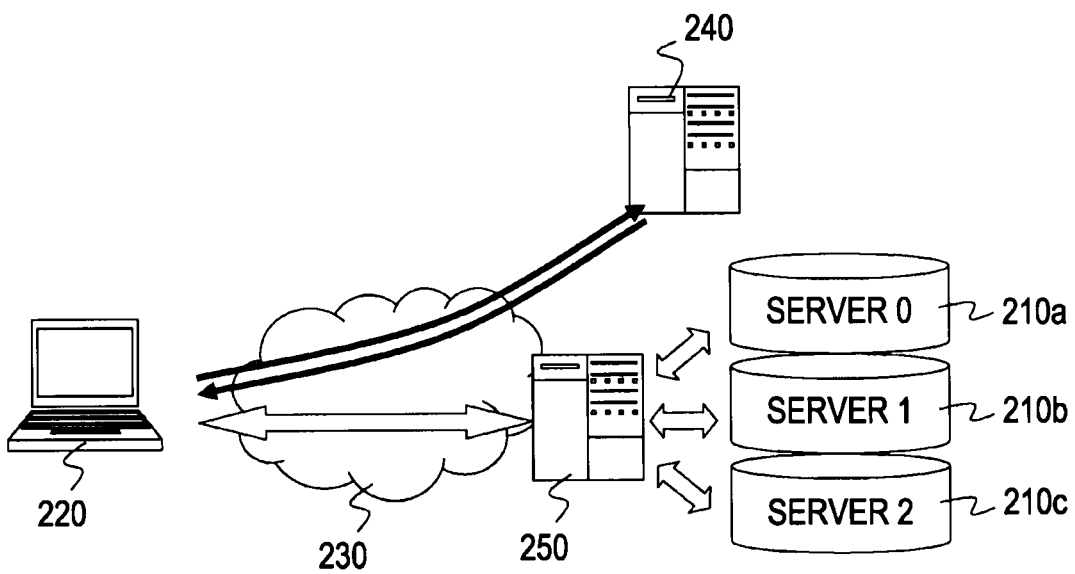
FIG. 20 is a diagram illustrating a load distribution employing a load balancer which is another example of the load distribution technique performed so that the number of deliveries is increased.

Note that although the image pickup data is delivered as content in the foregoing embodiment, content to be delivered is not limited to this. For example, as shown in a content delivery system 100A of FIG. 17, a broadband audio stream of high quality may be delivered.

Although the NGN (Next Generation Network) is used as a network In the foregoing embodiment, the embodiment of the present invention may be similarly applied to a case where content is delivered through other networks including the Internet.

It should be understood by those skilled in the art that various modifications, combinations, sub-combinations and alterations may occur depending on design requirements and other factors insofar as they are within the scope of the appended claims or the equivalents thereof.

What is claimed is:

1. A camera server comprising:
an image pickup unit implemented by a processor and configured to capture an image of an object and output image pickup data representing the image of the object;
a delivery request reception unit implemented by the processor and configured to receive a delivery request transmitted from a client terminal connected to a network, on which Session Initiation Protocol (SIP) is used;
a determination unit implemented by the processor and configured to
determine whether the image pickup data is to be delivered to the client terminal by the camera server in response to the delivery request, when the delivery request is received using the delivery request reception unit, and
determine whether a booster server is available to deliver the image pickup data to the client terminal, when the determination unit determines that the image pickup data is not to be delivered to the client terminal by the camera server; and
a transmission unit implemented by the processor and configured to
stream the image pickup data output from the image pickup unit of the camera server to the client terminal which is a transmission source of the delivery request received using the delivery request reception unit, when the determination unit determines that the image pickup data is to be delivered to the client terminal by the camera server,
send via a SIP proxy server, to the client terminal, a response indicating acceptance of the delivery request transmitted from the client terminal, when the determination unit determines that the image pickup data is not to be delivered to the client terminal by the camera server, send via the SIP proxy server, after the response indicating acceptance of the delivery request has been sent to the client terminal, a request for a stream session with the booster server when the determination unit determines that the image pickup data is not to be delivered to the client terminal by the camera server, send via the SIP proxy server, to the client terminal, a notification of a busy state, when the determination unit determines that the image pickup data is not to be delivered to the client terminal by the camera server and when the determination unit determines that the booster server is not available to deliver the image pickup data to the client terminal, stream the image pickup data output from the image pickup unit of the camera server to the booster server connected to the network after establishing the stream session with the booster server, and transmit via the SIP proxy server a transfer command including information on the booster server to the client terminal which is the transmission source of the delivery request received using the delivery request reception unit, the transmission unit streams the image pickup data to the booster server and transmits the transfer command to the client terminal when the determination unit determines that the image pickup data is not to be delivered to the client terminal by the camera server and when the determination unit determines that the booster server is available to deliver the image pickup data to the client terminal, wherein no part of the image pickup data is stored at the booster server before the determination unit determines that the image pickup data is not to be delivered to the client terminal by the camera server, and the transmission unit communicates directly with the booster server after the stream session with the booster server is established.

2. The camera server according to claim 1, wherein the network corresponds to a next generation network.

3. The camera server according to claim 1, wherein the transmission unit is further configured to stream, when the determining unit determines that the booster server is not available to deliver the image pickup data to the client terminal and when it is determined that a second booster server is available, the image pickup data output from the image pickup unit of the camera server to the second booster server connected to the network, and further transmit a transfer command including information on the second booster server to the client terminal which is the transmission source of the delivery request received using the delivery request reception unit.

4. The camera server according to claim 1, wherein the transmission unit communicates directly with the booster server only by the streaming of the image pickup data via the stream session.

5. The camera server according to claim 1, wherein the image pickup data is stored at the camera server, without being stored at an attached external storage device.

6. The camera server according to claim 1, wherein the delivery request reception unit receives, via the SIP proxy server, the delivery request transmitted from the client terminal.

7. A content delivery method for a camera server including an image pickup unit implemented by a processor and configured to capture an image of an object and output image pickup data representing the image of the object, and a delivery request reception unit implemented by the processor and configured to receive a delivery request transmitted from a client terminal connected to a network, on which Session Initiation Protocol (SIP) is used, the content delivery method comprising the steps of:

determining, using the processor, whether the image pickup data is to be delivered to the client terminal by the camera server in response to the delivery request, when the delivery request is received using the delivery request reception unit;

determining whether a booster server is available to deliver the image pickup data to the client terminal, when it is determined that the image pickup data is not to be delivered to the client terminal by the camera server;

streaming the image pickup data output from the image pickup unit of the camera server to the client terminal which is a transmission source of the delivery request received using the delivery request reception unit, when it is determined that the image pickup data is to be delivered to the client terminal by the camera server;

sending via a SIP proxy server, to the client terminal, a response indicating acceptance of the delivery request transmitted from the client terminal, when it is determined that the image pickup data is not to be delivered to the client terminal by the camera server;

sending via the SIP proxy server, after the response indicating acceptance of delivery request has been sent to the client terminal, a request for a stream session with the booster server when it is determined that the image pickup data is not to be delivered to the client terminal by the camera server;

sending via the SIP proxy server, to the client terminal, a notification of a busy state, when it is determined that the image pickup data is not to be delivered to the client terminal by the camera server and when it is determined that the booster server is not available to deliver the image pickup data to the client terminal; and streaming the image pickup data output from the image pickup unit of the camera server to the booster server connected to the network after establishing the stream session with the booster server, and transmitting via the SIP proxy server a transfer command including information on the booster server to the client terminal which is the transmission source of the delivery request received using the delivery request reception unit, the streaming of the image pickup data to the booster server and the transmitting of the transfer command to the client terminal occur when it is determined that the image pickup data is not to be delivered to the client terminal by the camera server and when it is determined that the booster server is available to deliver the image pickup data to the client terminal, wherein no part of the image pickup data is stored at the booster server before it is determined that the image pickup data is not to be delivered to the client terminal by the camera server, and the delivery server communicates directly with the booster server after the stream session with the booster server is established.

\* \* \* \* \*